(12) United States Patent
Islam et al.

(10) Patent No.: US 6,202,132 B1
(45) Date of Patent: Mar. 13, 2001

(54) FLEXIBLE CACHE-COHERENCY MECHANISM

(75) Inventors: Nayeem Islam, Thornwood; Trent Ray Jaeger, Croton-on-Hudson; Jochen Liedtke, Ossining; Vsevolod V. Panteleenko, North White Plains, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/473,660

(22) Filed: Dec. 29, 1999

Related U.S. Application Data

(62) Division of application No. 08/978,745, filed on Nov. 26, 1997, now Pat. No. 6,032,228.

(51) Int. Cl.[7] .................................................. G06F 12/12
(52) U.S. Cl. ...................... 711/141; 711/133; 711/144; 711/154
(58) Field of Search ........................... 711/161, 144–145, 711/159, 133, 141, 154, 134; 707/201

(56) References Cited

U.S. PATENT DOCUMENTS

| | | | |
|---|---|---|---|
| 5,119,485 | * 6/1992 | Ledbetter, Jr. et al. | 395/425 |
| 5,809,536 | * 9/1998 | Young et al. | 711/144 |
| 5,960,457 | * 9/1999 | Skrovan et al. | 711/146 |
| 5,987,571 | * 11/1999 | Shibata et al. | 711/141 |

\* cited by examiner

*Primary Examiner*—Reginald G. Bragdon
*Assistant Examiner*—Denise Tran
(74) *Attorney, Agent, or Firm*—Wayne L. Ellenbogen; Anne Vachon Dougherty

(57) ABSTRACT

A cache system in accordance with the present invention consists of one or more cache components and a set of one or more consistency-replacement functions. A cache component caches one or more items in its one or more cache entries. Items that hit in the cache can result in corresponding cache entries being read or written. Any valid entry in a cache component includes status information reflecting whether the entry has been accessed and whether it has been modified, and is linked to a consistency-action matrix that, in correspondence with the entry's status information and access type (i.e. read or write), determines what consistency action has to be executed in conjunction with the current entry access. Consistency actions and the consistency-action matrix are the inventive mechanisms for implementing cache-coherency and cache-replacement policies. Any valid entry in a cache is linked to a consistency-replacement function that implements one or more consistency and/or replacement policies. Consistency-replacement functions are application-specific and are implemented by means of the consistency-action matrix.

26 Claims, 28 Drawing Sheets

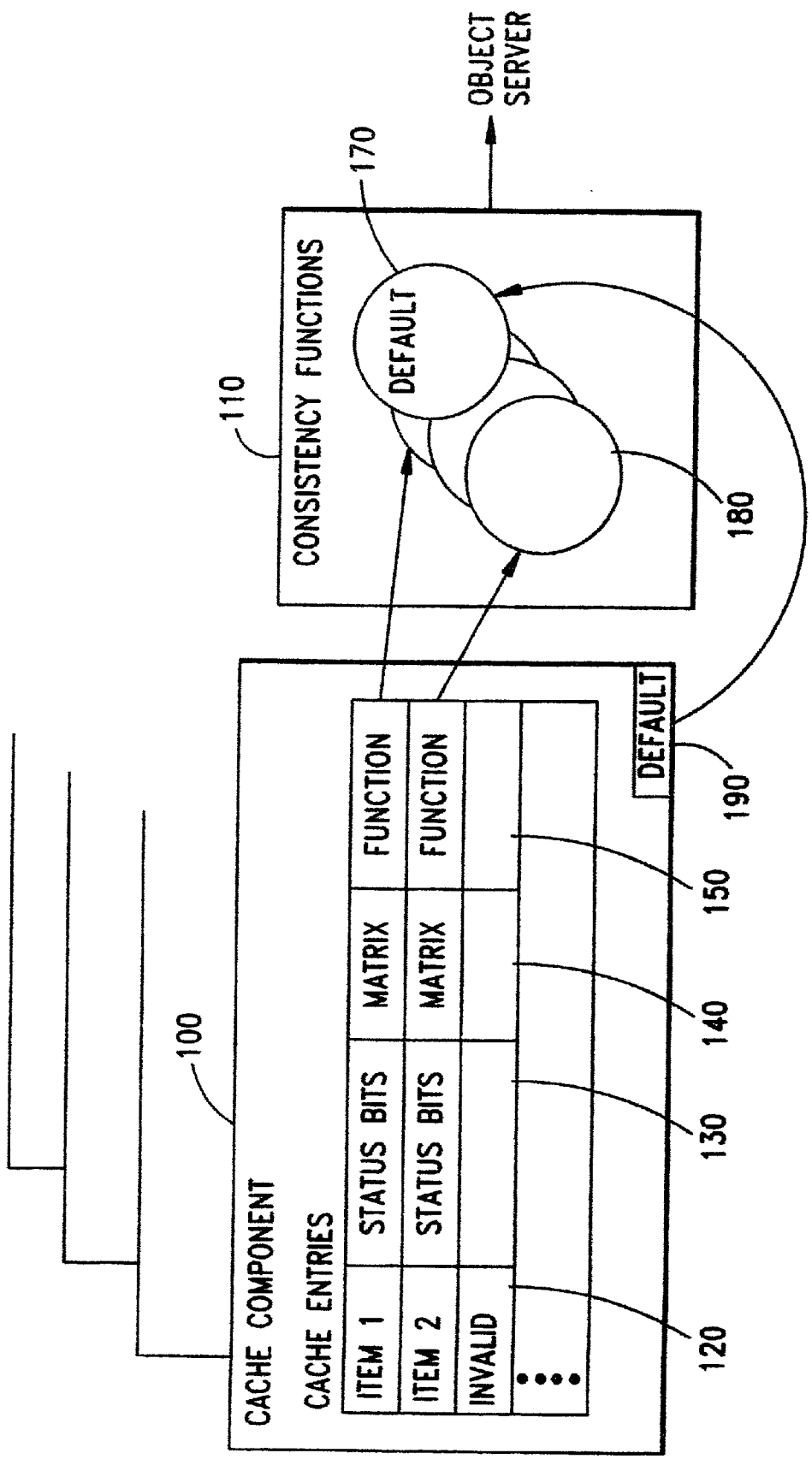

FIG.1c
CONSISTENCY-ACTION MATRIX

| | NOT ACCESSED NOT DIRTY | NOT ACCESSED DIRTY | ACCESSED NOT DIRTY | ACCESSED DIRTY |
|---|---|---|---|---|
| READ | CONSISTENCY ACTION [0,1] 141 | CONSISTENCY ACTION [0,1] 142 | CONSISTENCY ACTION [0,2] 143 | CONSISTENCY ACTION [0,3] 144 |
| WRITE | CONSISTENCY ACTION [1,0] 145 | CONSISTENCY ACTION [1,1] 146 | CONSISTENCY ACTION [1,2] 147 | CONSISTENCY ACTION [1,3] 148 |

140

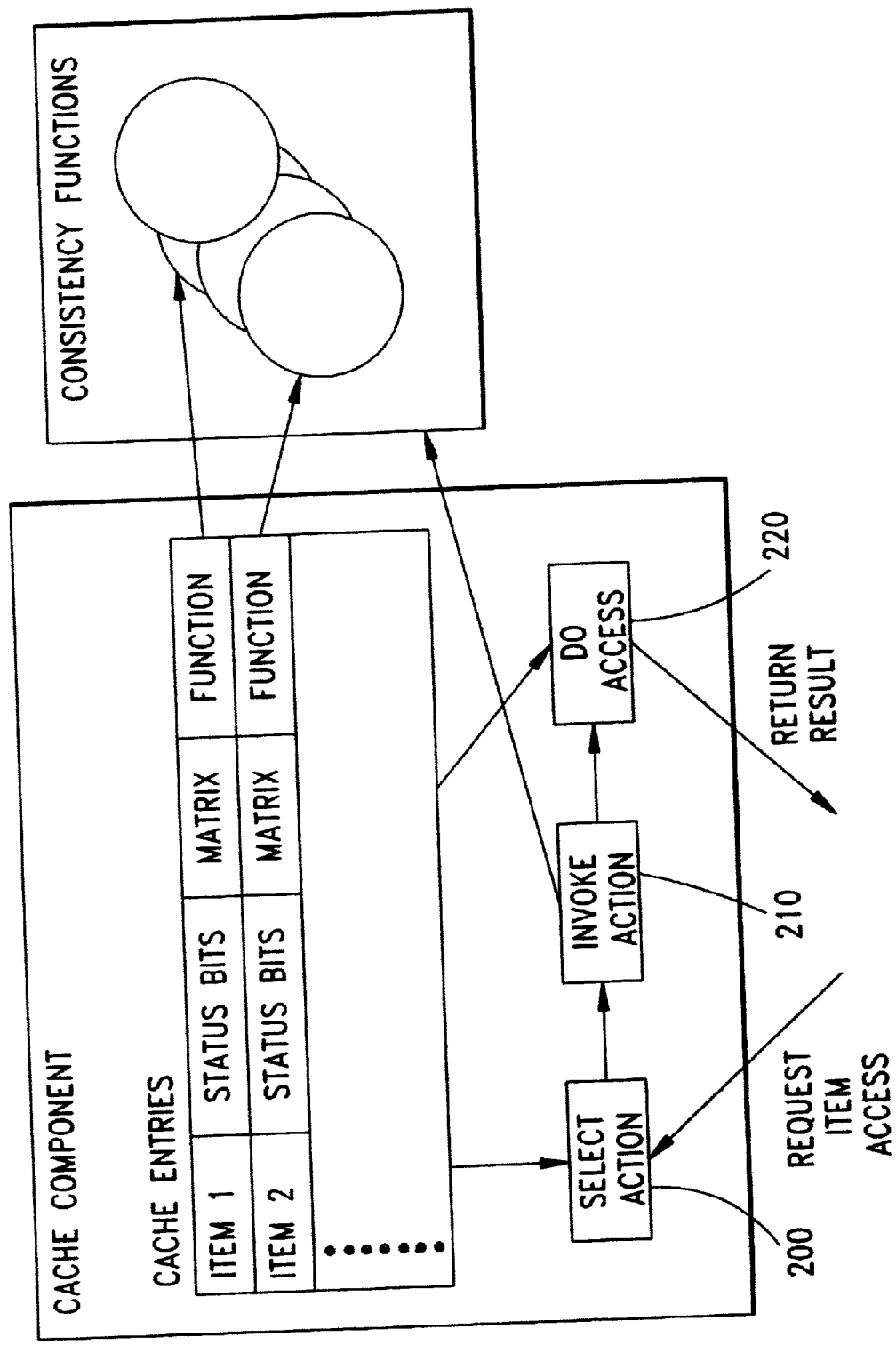

RESTART OPTION IF CONCURRENT CALL OR PROPAGATE ON THIS ENTRY IS PENDING (VARIANT 2)

FIG.25

CONSISTENCY ACTION MATRIX

|  | ¬ACCESSED ¬DIRTY | ¬ACCESSED DIRTY | ACCESSED ¬DIRTY | ACCESSED DIRTY |
|---|---|---|---|---|
| READ | PRIMARY CONSISTENCY ACTION / SECONDARY CONSISTENCY ACTION / DEADLINE / TIMER | | | |
| WRITE | | PRIMARY CONSISTENCY ACTION / SECONDARY CONSISTENCY ACTION / DEADLINE / TIMER | | |

140, 3010, 3020, 3030

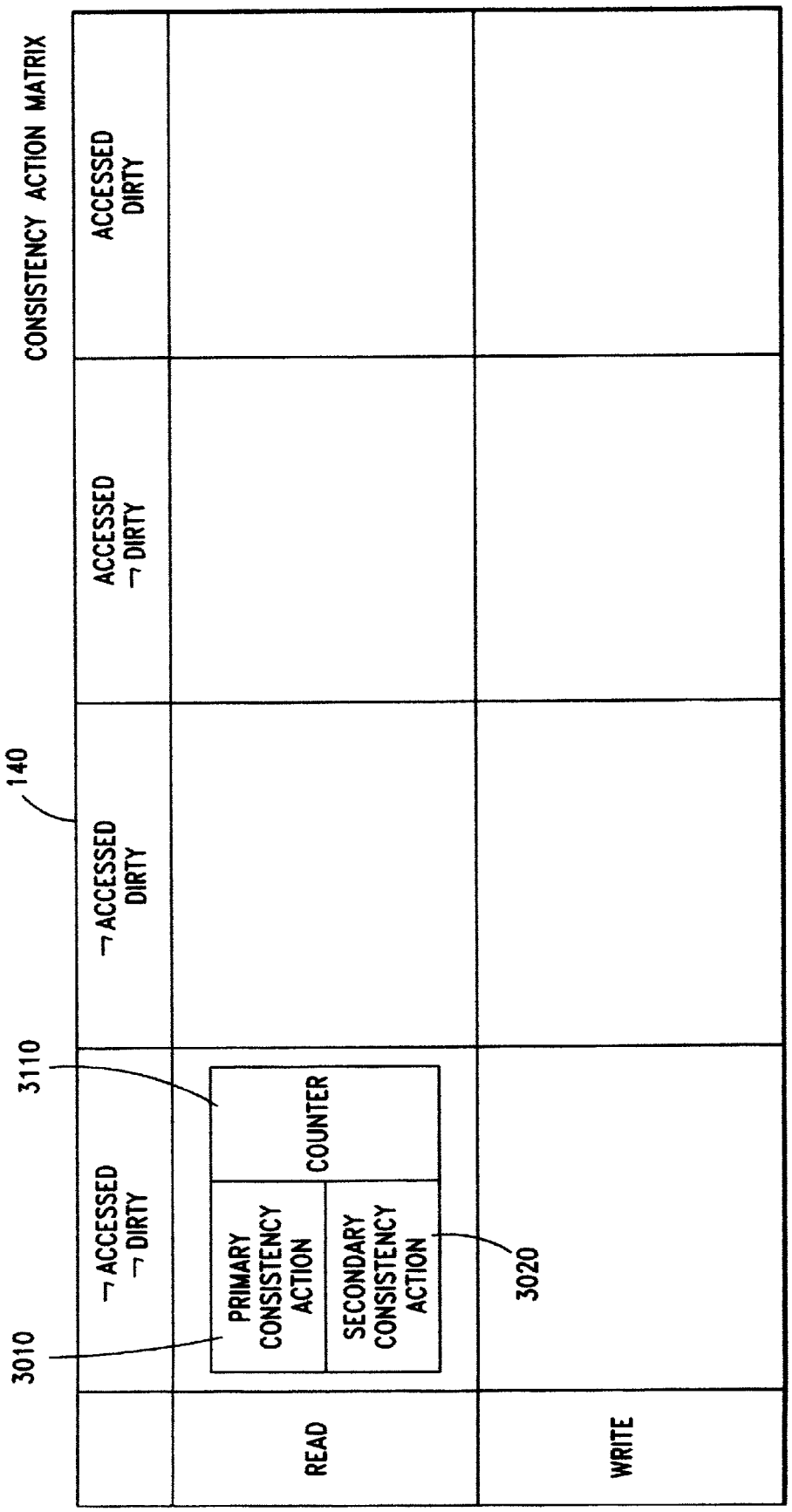

FLEXIBLE CACHE-COHERENCY MECHANISM

CROSS-REFERENCE TO RELATED INVENTIONS

This is a division of application Ser. No. 08,978,745, filed Nov. 26, 1997, U.S. Pat. No. 6,032,228.

The invention is related to a co-pending application, assigned to the present assignee, Ser. No. 08/980,074, which was filed on even date herewith and is entitled "A Powerful and Flexible Server Architecture". The co-pending application is incorporated by reference herein in its entirety.

FIELD OF THE INVENTION

The present invention relates generally to caching and more particularly to an improved cache architecture that enables the implementation of custom-specific and/or item-specific cache-coherency and cache-replacement policies. It can be used for software caches (e.g., file caches or server caches) as well as hardware caches.

BACKGROUND OF THE INVENTION

For the future, it is envisioned that local networks will be called upon to serve from thousands to hundreds of thousands of resource-poor clients. These networks might be intra-building, intra-organization or even intra-city. Customizable and nevertheless extremely high performing servers will be required. These servers will heavily rely on caching. The hit server/miss server architecture described in the aforementioned co-pending patent application entitled "A Powerful And Flexible Server Architecture" is one example. The server architectures need basic cache-coherency mechanisms that permit efficient and simple implementation of application-specific cache-coherency and cache-replacement policies, preferably on a per item basis.

A huge variety of cache-coherency and cache-replacement policies is known, including the MESI (Modified, Exclusive, Shared, Invalid) protocol, which is mostly used for hardware cache memories, and lazy release consistency, which is mostly used for distributed-shared-memory systems implemented by software.

What is needed is a set of general basic mechanisms that enable one to implement virtually any (known or new) cache-coherency and/or cache-replacement policy. The basic mechanisms can be implemented by software, by hardware, or by a combination of both.

SUMMARY OF THE INVENTION

A cache system in accordance with the present invention consists of one or more cache components and a set of one or more consistency-replacement functions. A cache component caches one or more items in its one or more cache entries. Items that hit in the cache can result in corresponding cache entries being read or written. Any valid entry in a cache component includes status information reflecting whether the entry has been accessed and whether it has been modified. Furthermore, any valid entry is linked to a consistency-action matrix that, in correspondence with the entry's status information and access type, (i.e. read or write) determines what consistency action has to be executed in conjunction with the current entry access. Consistency actions and the consistency-action matrix are the inventive mechanisms for implementing cache-coherency and cache-replacement policies.

Any valid entry in a cache is linked to an appropriate consistency-replacement function that implements one or more consistency and/or replacement policies. Consistency-replacement functions are application-specific and are implemented by means of the consistency-action matrix.

BRIEF DESCRIPTION OF THE DRAWINGS

The invention will now be described in greater detail with specific reference to the accompanying figures wherein:

FIG. 1a shows basic components that are used to implement the flexible cache-coherency mechanism.

FIG. 1c shows a consistency-action matrix of the present invention in more detail.

FIG. 2 shows the inventive process data flow for the basic cache-coherency mechanism.

FIG. 25 shows secondary consistency actions with deadline timers in accordance with the present invention.

FIG. 26 shows secondary consistency actions with access counters in accordance with the present invention.

DETAILED DESCRIPTION OF THE PREFERRED EMBODIMENT

Figure 1B:
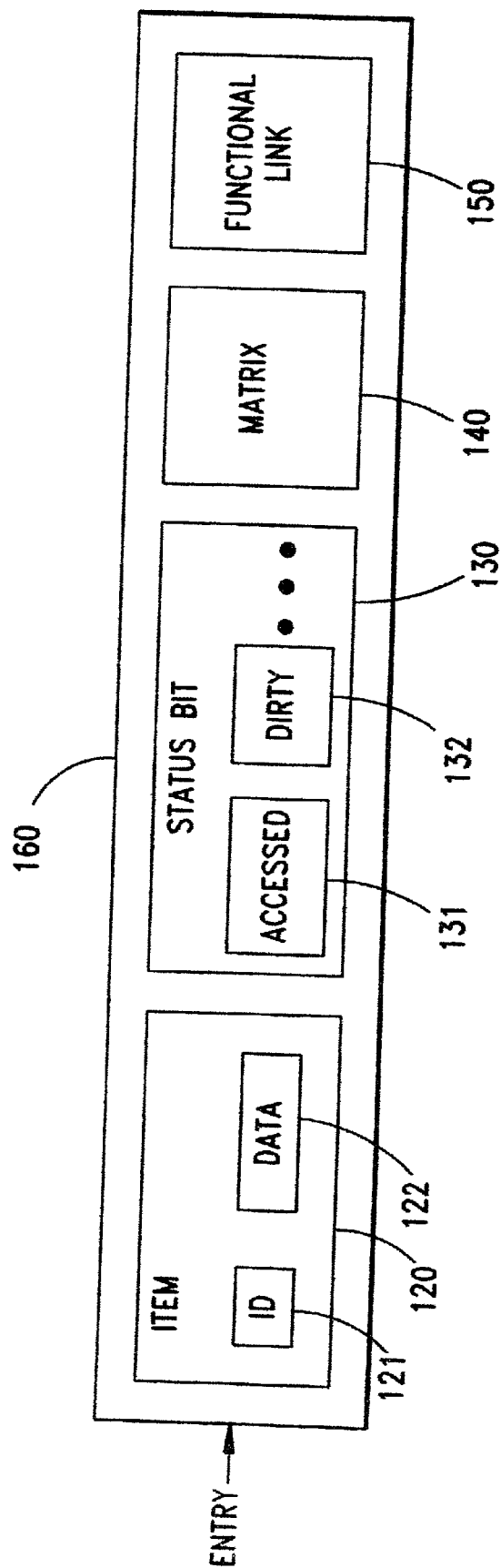
FIG. 1b shows a cache entry of the present invention in more detail.

FIG. 1a illustrates a cache system for implementing the present invention. The cache system consists of one or more cache components (100) and a set (110) of consistency-replacement functions (180). A cache component (100) consists of one or more cache entries (160). Each cache entry (160) is either invalid, such that the cache currently holds no item, or is valid, such that it currently holds an item (120). Those skilled in the art will understand that the mentioned cache systems can be built entirely in hardware or entirely in software or as a combination of hardware and software components.

A representative software cache component (100) can comprise an off-the-shelf PC, equipped with a 200-MHz PentiumPro* uniprocessor, an Intel* chipset, and 256-K of L2 cache memory running any standard operating system, such as the preferred L4 microkernel[1]. In the preferred embodiment, consistency-functions (180) are implemented as processes under the Linux* operating systems on a second machine, with the two machines being are connected via a 100 Mbps Ethernet or other appropriate communications connection. Clients are connected via further communications networks, such as 100 Mbps Ethernets, to the cache component (100).

[1]*Indicates Trademarks of respective owners

When a request for an item finds a "hit" in the cache (i.e., there is an entry (160) in one or more cache components (100) that currently holds the item), that item can be read or written. FIG. 1a shows a valid entry (160) in more detail. The depicted entry contains the item (120) that it currently holds, with the item consisting of the item id (121) and the item data (122). Depending upon the type of cache, the item id (121) can be a virtual address, a physical memory address, a file name, an object identifier, or other representation.

Any valid entry (160) in a cache component (100) also holds status information (130) reflecting at least whether the item has been accessed and modified. Status information is implemented by the status bits 'accessed' (131) and 'dirty' (132). The status 'NOT dirty' (i.e. dirty=false) is also called 'clean'.

Furthermore, any valid entry (160) is linked to a consistency-action matrix (140) or contains a consistency-action matrix (140). Said consistency-action matrix (140) determines, in correspondence with the entry's status information (130) and the access type (1001), (i.e. read or write), what consistency action has to be executed in conjunction with the current item access. FIG. 1c shows a consistency-action matrix (140) consisting of 2×4 elements (141 . . . 148). A consistency-action matrix can also consist of 4×4 elements (not shown) as further discussed below. Consistency actions and consistency-action matrices (140) are basic general mechanisms for implementing cache-coherency and cache-replacement policies.

Any valid entry (160) is additionally linked (150) to a consistency-replacement function (180) that implements one or more consistency and/or replacement policies. Furthermore, each cache component (100) contains a link (190) into the set (110) of consistency-replacement functions. Said link (190) specifies the cache component's (100) default consistency-replacement function (170). In the case of a cache miss in this component (100) (i.e., there is no entry (160) in the cache component (100) corresponding to the current access), the default-consistency-replacement function (170) is invoked by the cache component (100) and the miss is handled. All consistency-replacement functions (including the default consistency-replacement functions) are application-specific and are implemented by means of the consistency-action matrix.

In the preferred embodiment, all accesses to a cache component (100) by a consistency-replacement function (180 or 170) are treated as non-sensitive accesses. Non-sensitive accesses are simple conventional accesses to the cache component and do not involve consistency actions as described below. Accesses by consistency-replacement functions (180 or 170) are read, write, insert and delete, where the latter two insert new items into the cache component (100) or delete items from the cache component (100).

In the preferred embodiment, all other accesses, i.e., not made by consistency-replacement functions (170 or 180), are sensitive accesses as described below. In the preferred embodiment, all accessors that are not contained in the set (110) of consistency-replacement functions can only execute read or write accesses.

The inventive basic general consistency mechanisms are now described. Upon any sensitive access, the following procedure, illustrated in FIG. 2, is followed. First, it is verified whether the cache component (100) contains a valid entry (160) that currently holds the requested item (1002) (i.e. the item to be accessed) in the entry's item (120). If no matching entry (160) is found, a "miss" is signaled to the default consistency-replacement function (170) that is linked by link (190) to this cache component (100). The default consistency-replacement function (170) can then execute by, for example, retrieving the addressed item, loading it into a cache entry (160) (insert), and finally restarting the original access. If a matching entry is found, (a "hit"), the consistency action (see below) is determined from information in the cache entry (160) and then executed by the general mechanism (210), which may result in the invocation of a consistency function (180). Once the consistency action is performed, the requested access is executed (220). In the preferred embodiment, consistency-replacement functions (170 and 180) can execute arbitrary (nonsensitive) accesses on the cache component (100) while a sensitive access waits for a reply from one of said consistency-replacement functions (170 or 180). However, the consistency-replacement function may subsequently modify or abort the requested access.

Figure 3:
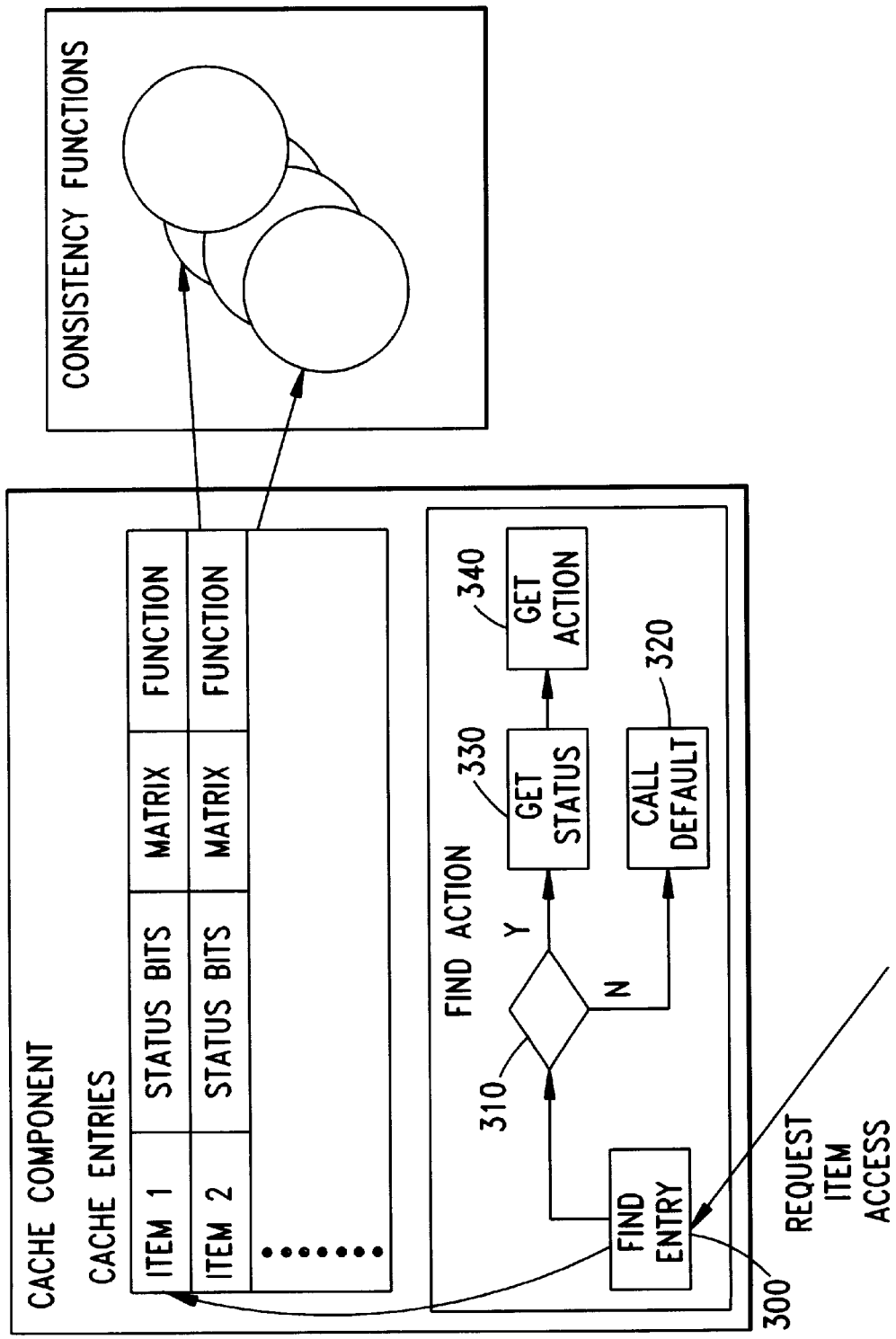
FIG. 3 shows the process data flow for the Find Action step in the inventive cache-coherency mechanism.
Figure 8:
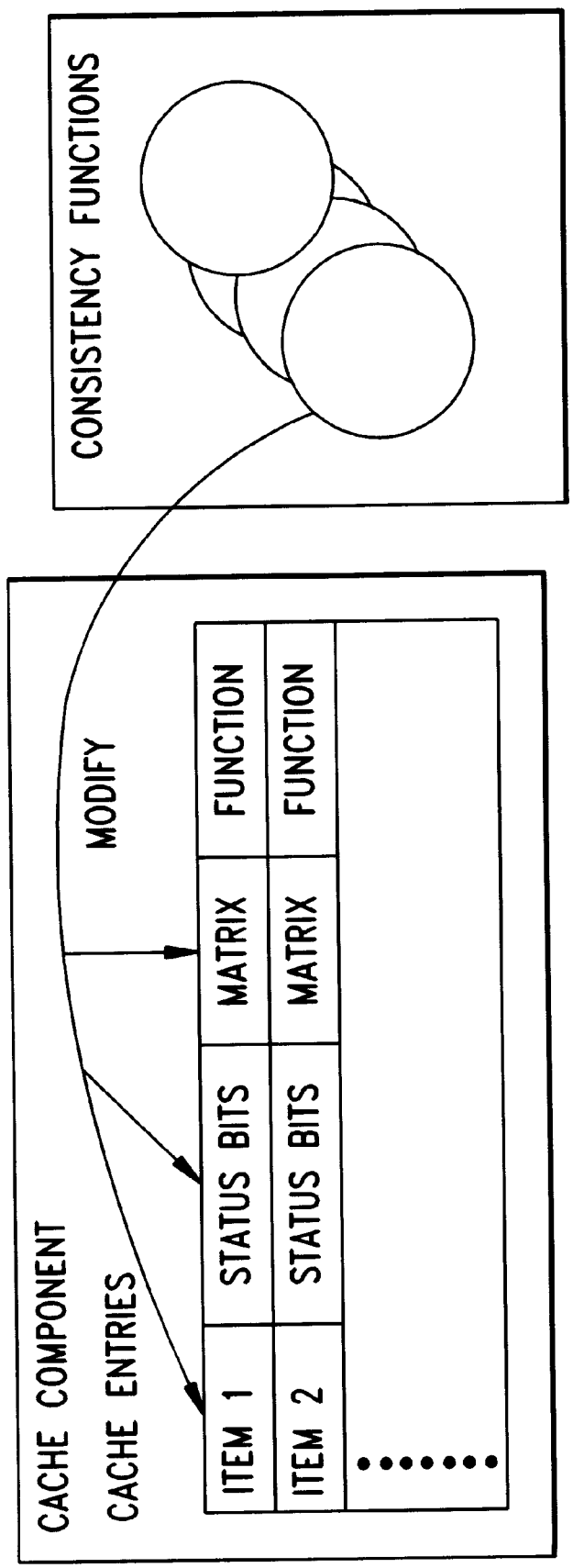
FIG. 8 illustrates that the consistency functions of the present invention can modify the cache entry's item, status information, and consistency-action matrix.

The item's consistency action is determined as shown in FIG. 3. After the cache entry (160) corresponding to the item (120) requested has been located (300), the entry's status bits (130) are examined to determine the item's status (330). Any cache component (100) maintains at least two status bits (130) per entry (160): the entry "accessed" (131) is set for any sensitive access, and the entry "dirty" (132) is set when a sensitive write access occurs. Nonsensitive accesses do not change the status bits (130). The cache component (100) never resets these bits (130) on its own. A consistency-replacement function, however, can arbitrarily change the status bits (130) (see FIG. 8). The consistency action is then determined (340). The combination of the four states, (NOT accessed, NOT dirty),
(NOT accessed, dirty),
(accessed, NOT dirty),
(accessed, dirty),
with the two possible operations,
   read,
   write,
leads to the 2×4 consistency-action matrix (140) with the elements (141 . . . 148). Additional operations, including "lock" and "unlock" may also be mapped onto the consistency-action matrix thereby providing a 4×4 element matrix. The "lock" operation would allow a client to prevent access by other clients to the cache item which is locked for a specified period of time. The "unlock" operation would, obviously, remove the restriction. Consistency-replacement functions can specify a consistency action for each of the fields for each entry.

Figure 4:
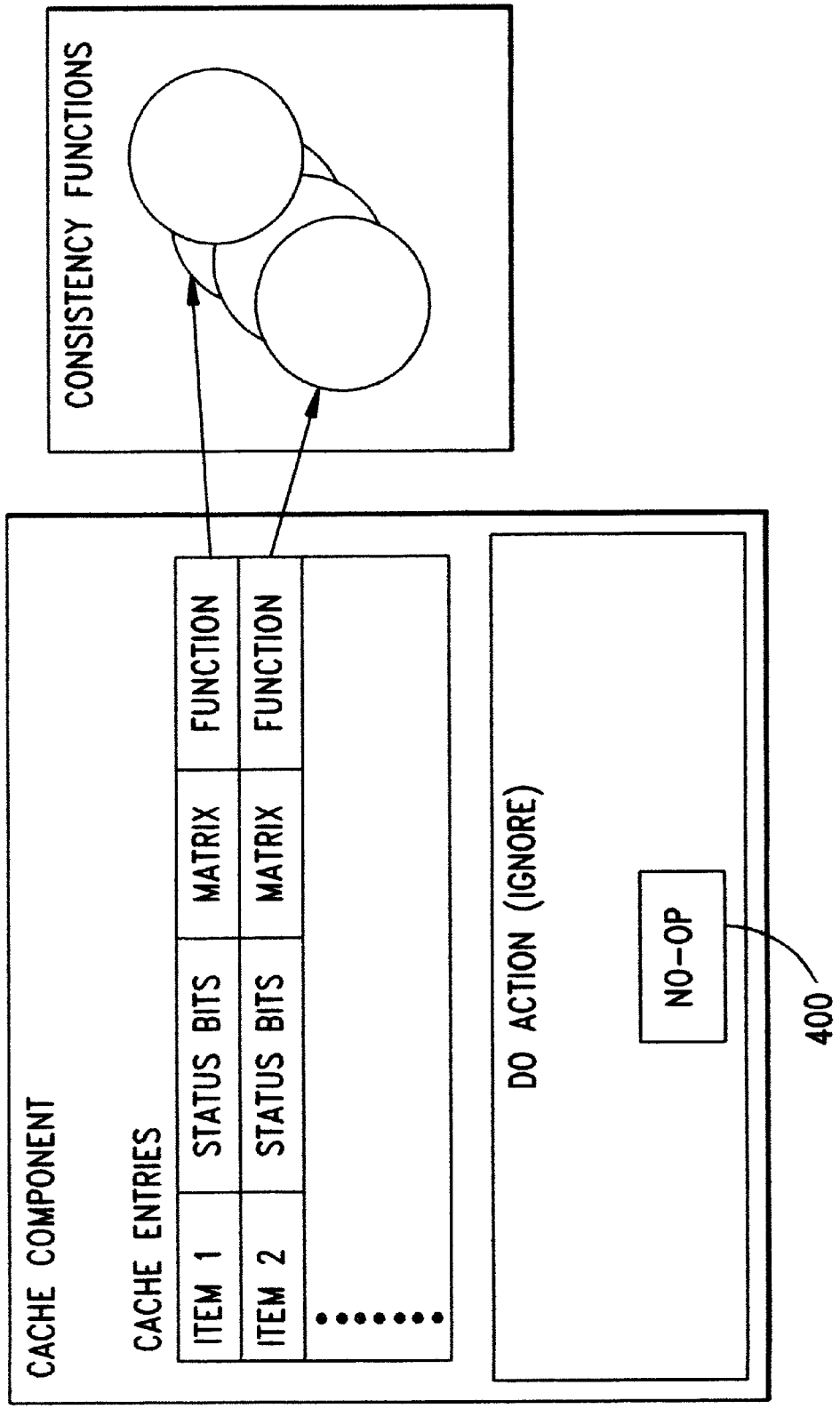
FIG. 4 shows the process data flow for the Do Action step in the inventive cache-coherency mechanism when the action selected from the consistency-action matrix is "ignore".
Figure 5:
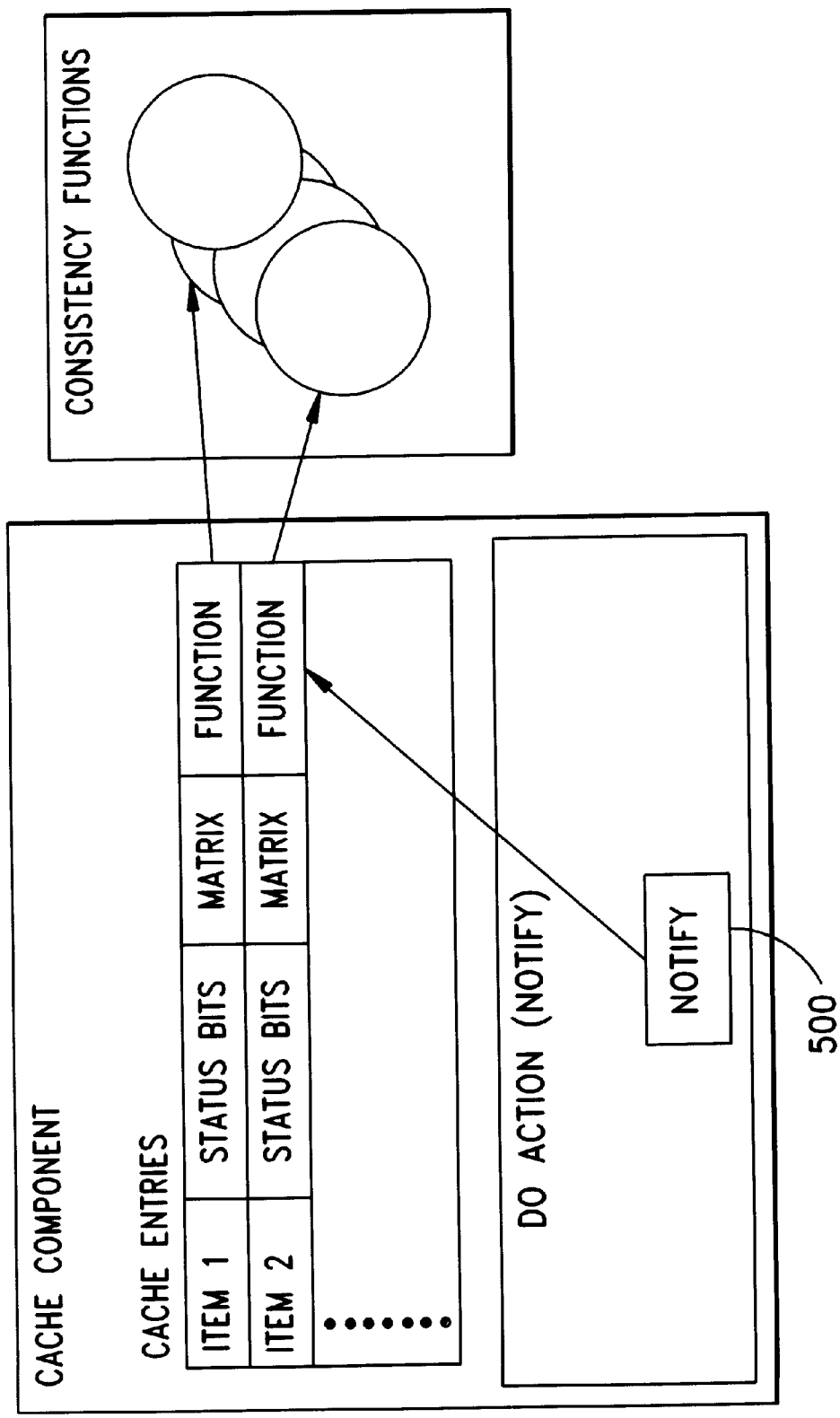
FIG. 5 shows the process data flow for the Do Action step in the inventive cache-coherency mechanism when the action selected from the consistency-action matrix is "notify".
Figure 6:
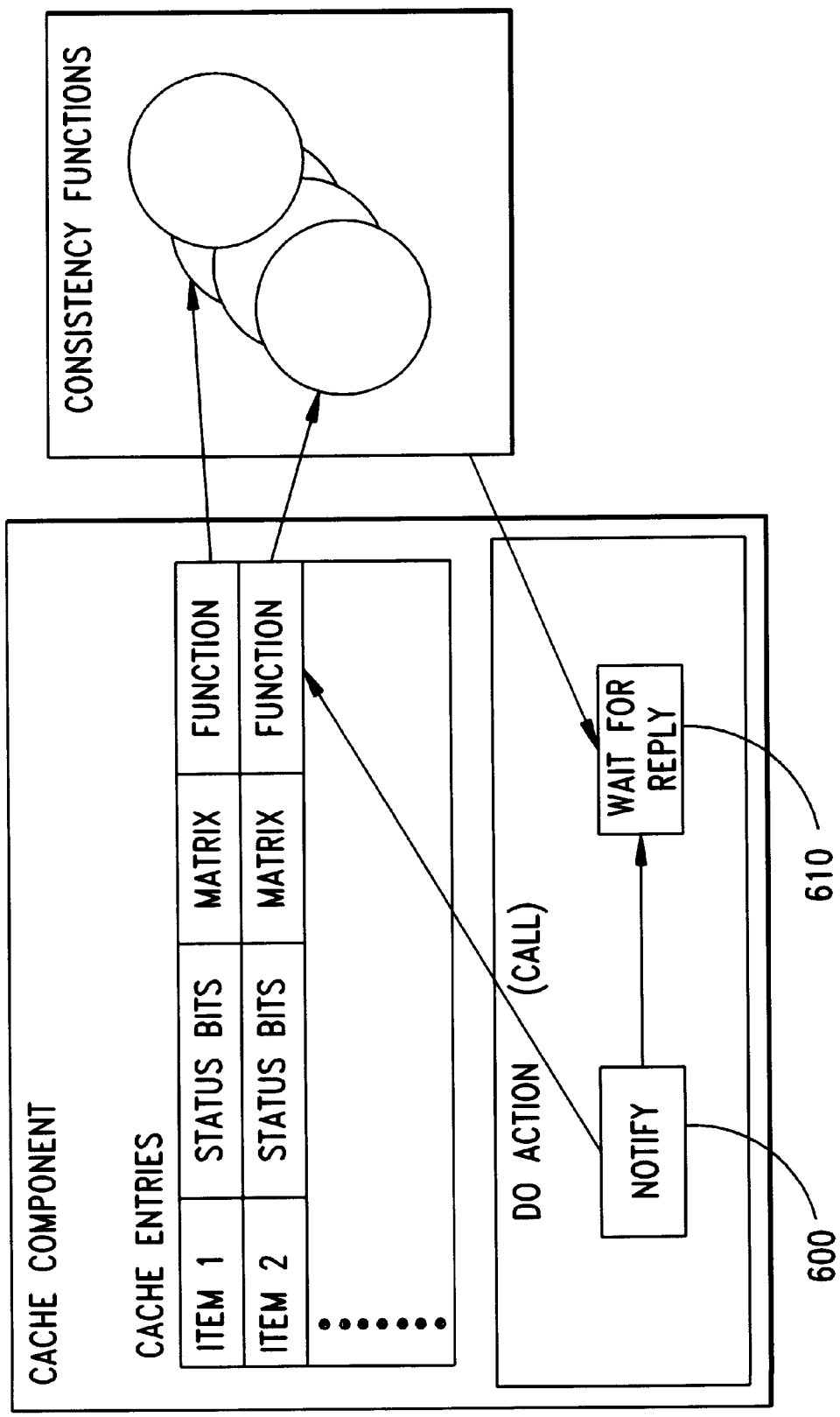
FIG. 6 shows the process data flow for the Do Action step in the inventive cache-coherency mechanism when the action selected from the consistency-action matrix is "call."
Figure 7:
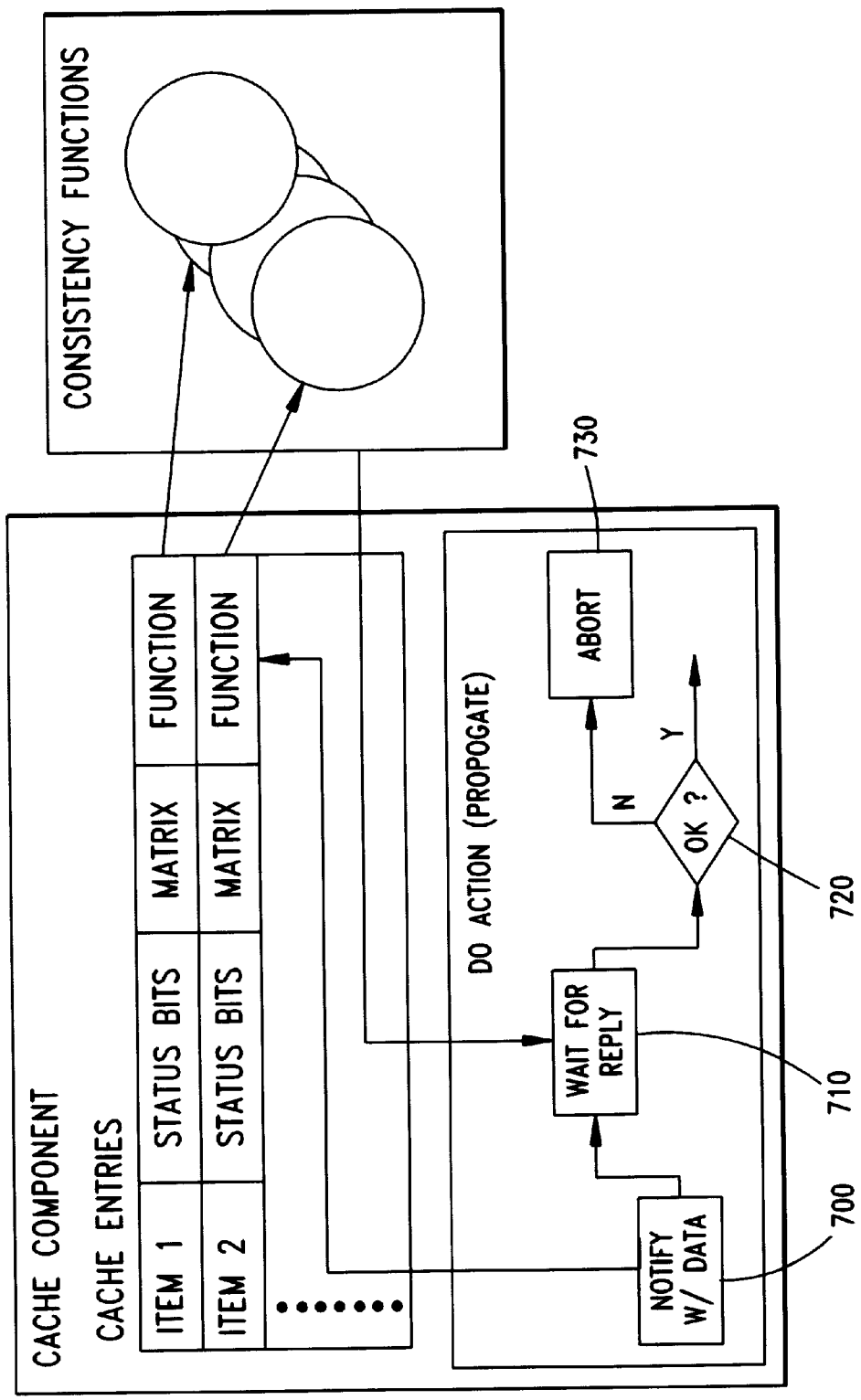
FIG. 7 shows the process data flow for the Do Action step in the inventive cache-coherency mechanism when the action selected from the consistency-action matrix is "propagate."

Consistency actions are not only useful for implementing item-specific coherency but also for replacement policies. Five different actions are possible in the preferred embodiment:

(1) Ignore.
   The operation (400) takes place without involving the consistency-replacement function (see FIG. 4).
(2) Notify.
   The item's consistency-replacement function (180) is notified about the operation (see FIG. 5). This notification (500) is non-blocking. The consistency-replacement function will be informed concurrently to serving the accessor's request. Subsequent identical notifications can be compressed into one notification.
(3) Notify Precisely,
   parallels the Notify function except that subsequent identical notifications are never compressed into one notification (see FIG. 5).
(4) Call.
   The item's consistency-replacement function is called (600) before the request is served (see FIG. 6). The request blocks (610) until the consistency-replacement function grants or denies it. In its reply, the consistency-replacement function can define new settings for the entry's accessed/dirty bits and the consistency-action matrix (140). Before replying to a call, the consistency-replacement function can itself read the item back or write the item to update its value (see FIG. 8). In the preferred embodiment, consistency-replacement function accesses on an item are nonsensitive accesses and therefore do not invoke a further consistency action nor change the entry's status (130). Call-associated actions are completely controlled by the corresponding consistency-replacement function, and usually have a higher latency than ignore-associated and notify-associated ones.
(5) Propagate.
   The access (including its data) is synchronously propagated to the corresponding consistency-replacement function before the request is served (see FIG. 7).

It is also possible to include the consistency action "Reject", whereby the access operation and status bit value combination would be mapped to a "reject" consistency operation, which operation would reject the access without involving any consistency function.

Any write access is directly propagated to the corresponding consistency-replacement function (write-through). The data to be written is sent to the consistency-replacement function (180) and concurrently used for updating the item in the entry (160). The cache component's (100) receive and propagate activities can be pipelined; however, like the call, the write is not acknowledged (710) until the consistency-replacement function replies (i.e., commits or aborts (720, 730) the access).

Prior to handling a sensitive read request, the cache component (100) itself issues a read request to the corresponding consistency-replacement function (180) to get the newest version of the item (read-through). Read requests might not include any data transfer if the consistency-replacement function decides that the requesting cache component (100) already holds the current item version. Receiving new item data from the consistency-replacement function and propagating it to the original read requestor can overlap in time. Like the call, the read is not acknowledged (710) until the consistency-replacement function commits or aborts (720,730) the access.

Sensitive Access Operations

A sensitive access to one cache component is to be described in a pseudocode notation and by flowcharts (FIGS. 10 to 24). The pseudocode notation denotes a sequential implementation of the mechanisms while the flowcharts (FIGS. 10 to 24) show an implementation with increased parallelism. Whenever operations or checks are described as parallel in the flowcharts, they can be executed in parallel or in an arbitrary sequence. The notation concentrates on the functionality of consistency actions and the interplay between sensitive accesses, consistency-action matrices, consistency actions, and consistency-replacement functions.

Figure 9:
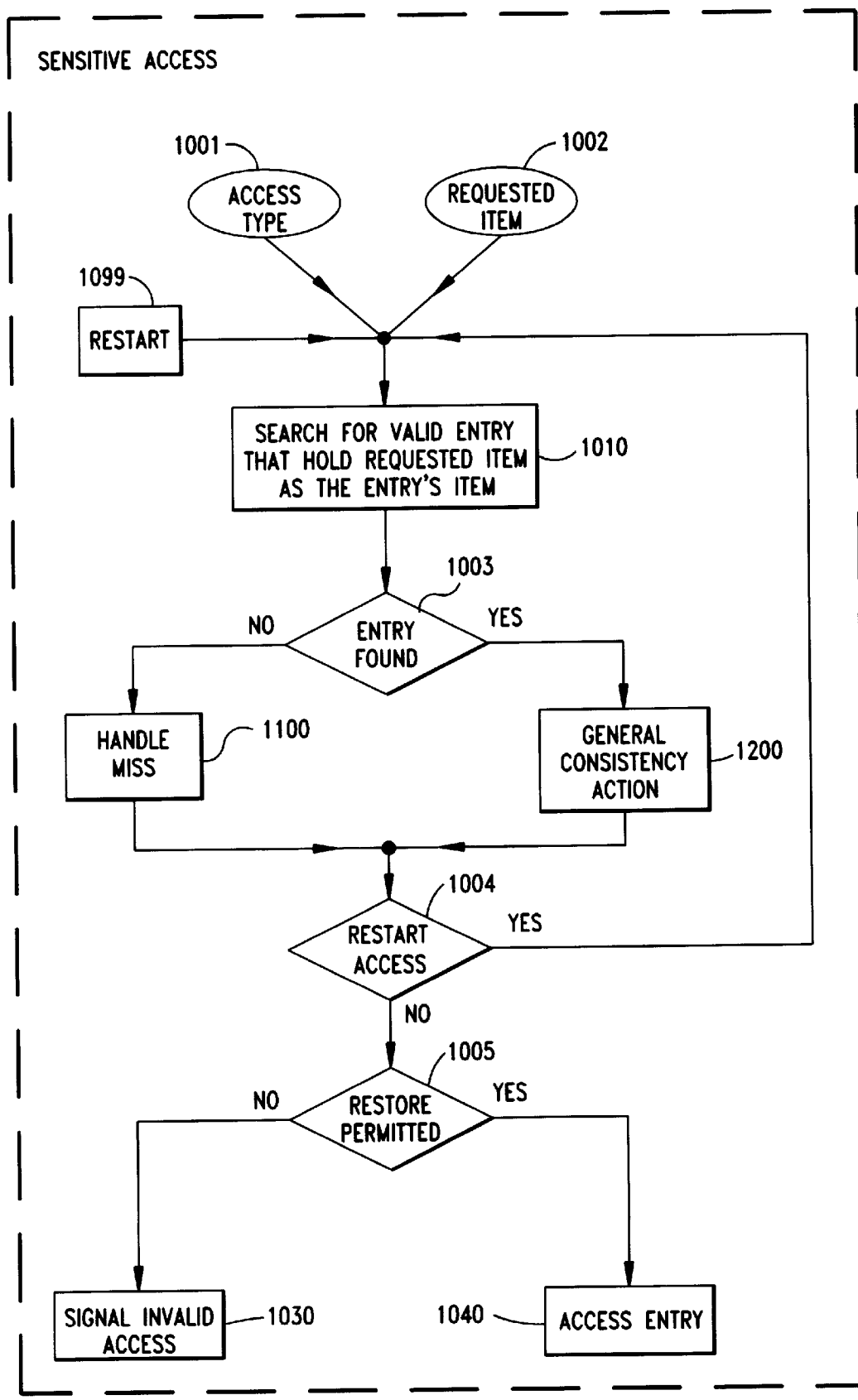
FIG. 9 describes a sensitive access in accordance with the present invention.
Figure 10:
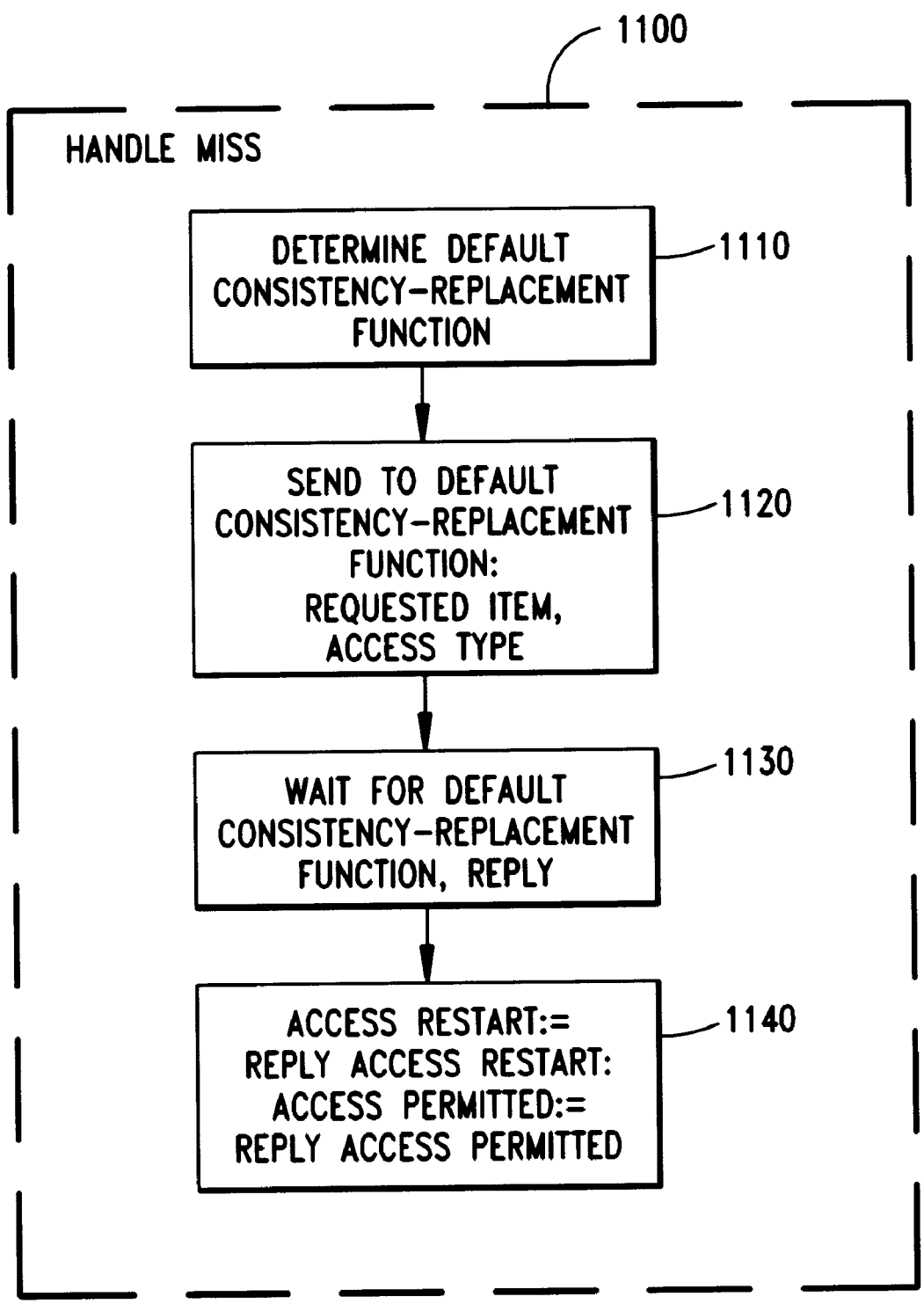
FIG. 10 describes miss handling in accordance with the present invention.

The procedure 'sensitive access' process flow (1000) (see FIG. 9) describes how a requested item (1002) is accessed with an access type (1001), which can be 'read' or 'write', in one cache component (100). First, the process searches for a valid entry (160) that holds the requested item (1002) as the entry's (160) item (120). In step 1003, a check is made as to whether such an entry (160) was found. If an entry (160) was found, the procedure 'general consistency action' (1200) (see FIG. 11) describes how to proceed. Otherwise, a miss is handled as described in 'handle miss' (1100) (FIG. 10). Both the 'general consistency action' (1200) and the 'handle miss' (1100) flows return the boolean values 'access restart' and 'access permitted'. If 'access restart' is true (step 1004), the entire access is restarted. If 'access restart' is false (step 1005), the 'access permitted' value is checked. If 'access permitted' is true, the access (i.e. read or write) is executed (step 1040). If however, 'access permitted' is false, an invalid access is signaled to the client (step 1030).

The 'handle miss' (1100) process first determines the default consistency-replacement function (170) (step 1110) that is associated with the cache component (100) by reading the link (190) pointing to this default consistency-replacement function (170). Next, the requested item (1002) and the access type (1001) are sent to the function (170) (step 1120) and the system waits for a reply from (190) (step 1130). It is the reply that delivers (step 1140) the boolean values 'access restart' and 'access permitted', as described above. By the foregoing process, the default consistency-replacement function can control how a miss should be handled and whether the access should be granted or denied.

Figure 11:
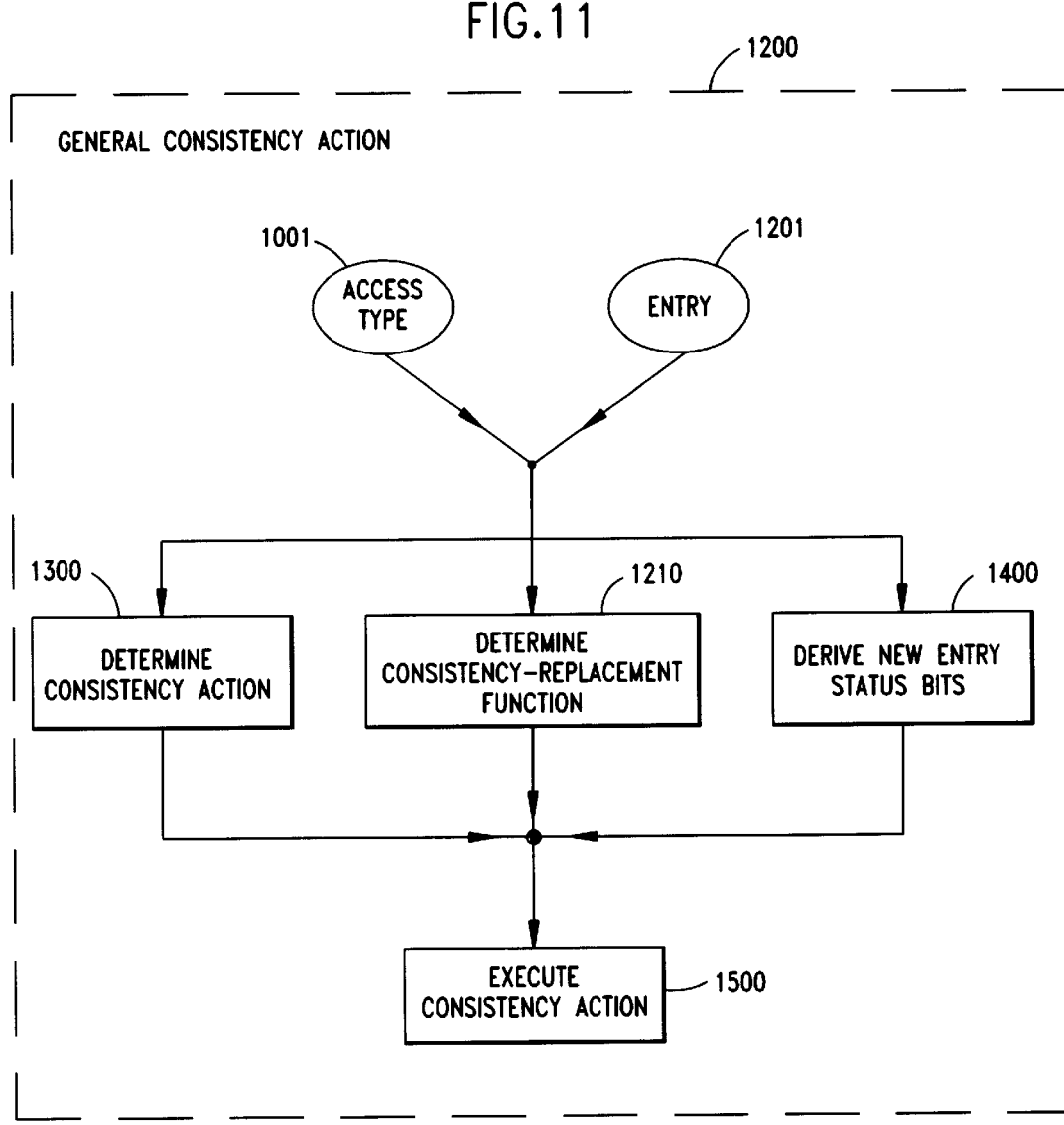
FIG. 11 describes how a consistency action is selected and executed in accordance with the present invention.

The 'general consistency action' flow (1200) of FIG. 11 works on the access type (1001) and the entry (160) selected by step (1010). The current consistency action is determined (1300); the consistency replacement function (180) linked to the entry (160) is determined (step 1210); and, the new status bits that the entry (160) would get if the consistency action subsequently permits the access and does not set new status bits on its own, are derived (1400). Finally, the consistency action is executed (1500).

Figure 12:
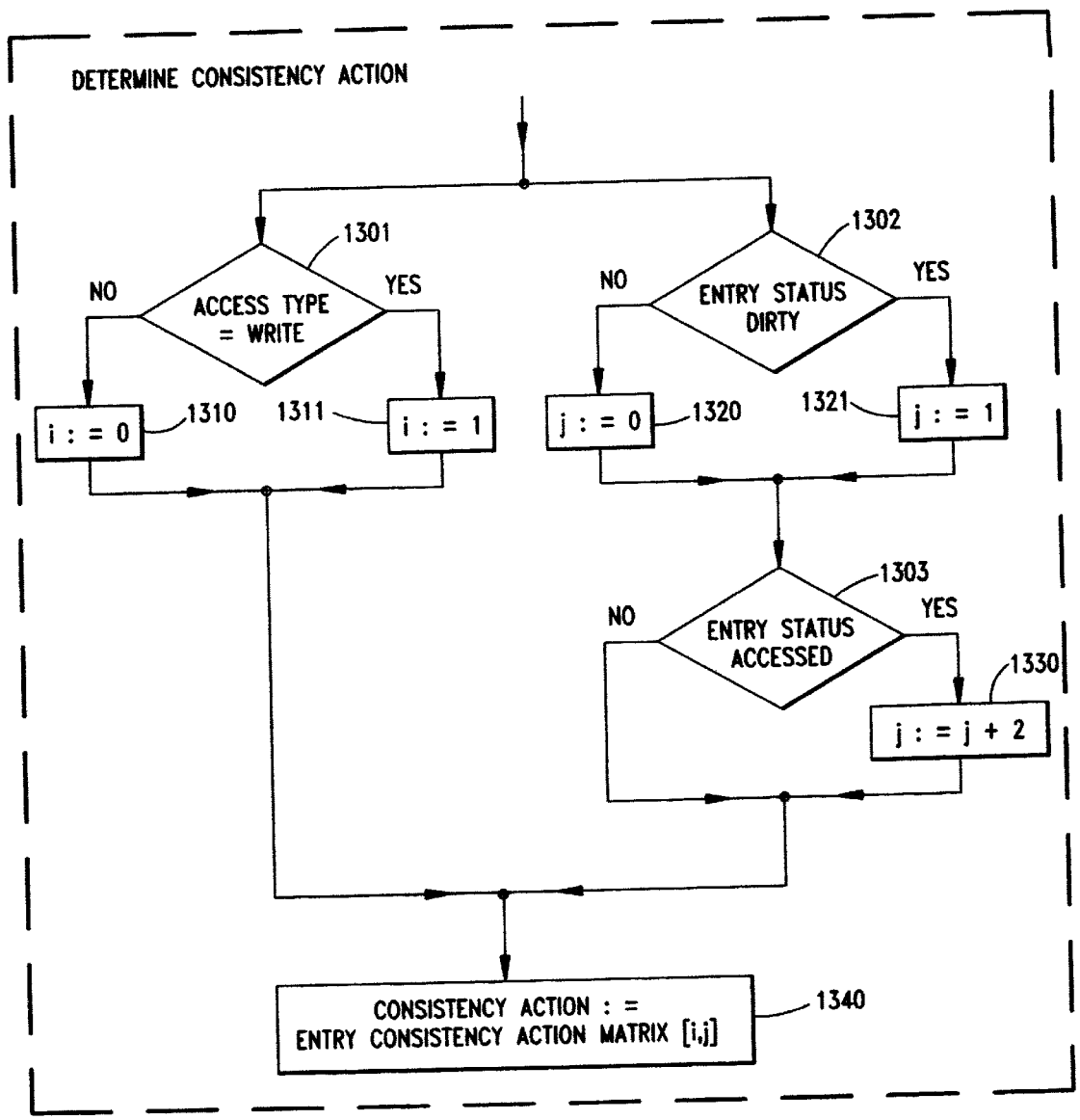
FIG. 12 describes how the consistency action is determined in accordance with the present invention.

The "determine consistency action" flow (1300) of FIG. 12 takes the consistency action matrix (140) of the entry (160), calculates a row index 'i' and a column index 'j' from the access type (1001), the entry's (160) 'accessed' bit (131) and the entry's 'dirty' bit (132), and extracts the corresponding element from the matrix (step 1340).

Figure 13:
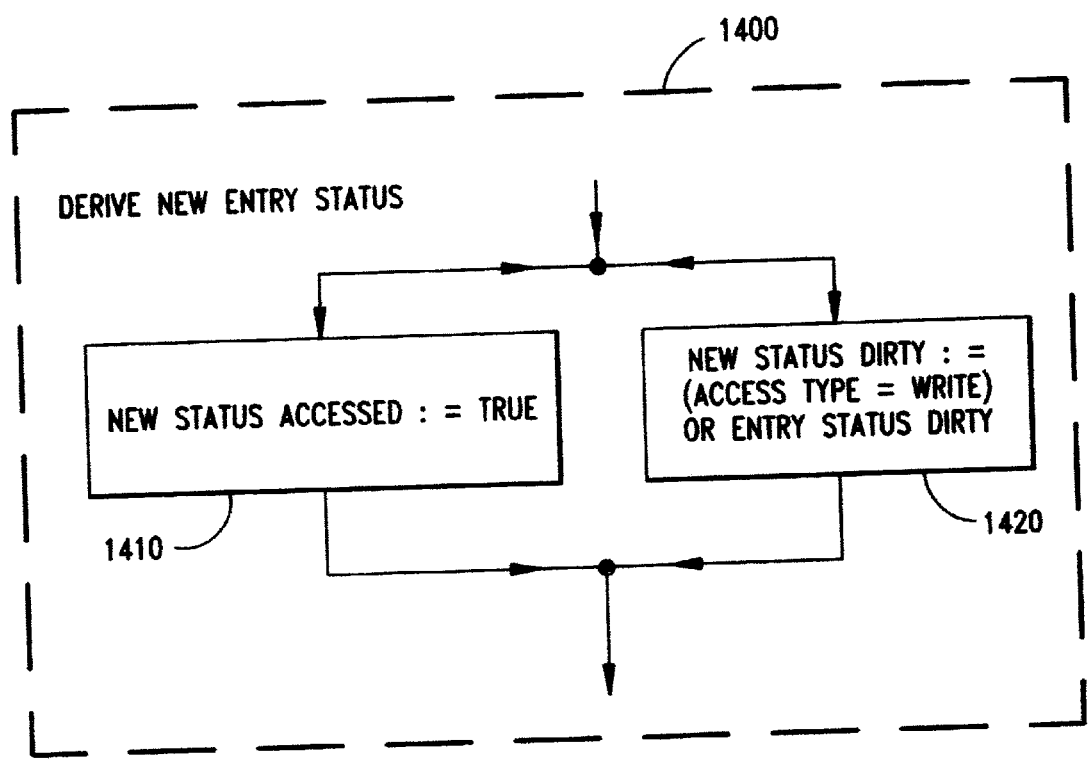
FIG. 13 describes how the new entry status is derived in accordance with the present invention.

The 'derive new entry status' flow (1400) of FIG. 13 calculates the new accessed and dirty bits 'new status.accessed' and 'new status.dirty'. The 'new status.accessed' bit is set to true (step 1410). The 'new status.dirty' is set to true only if the access type (1001) is 'write'. If the access type is not 'write', the 'dirty' bit (132) of the entry (160) is copied into 'new status.dirty' (step 1420). Note that this operation does not yet change the status bits (130) of the entry (160). It is only when the access is finally permitted, and it is determined that the consistency-replacement function did not set status bits on its own, that the 'new status' is copied into the status bits (130) of the entry (160).

Figure 14:
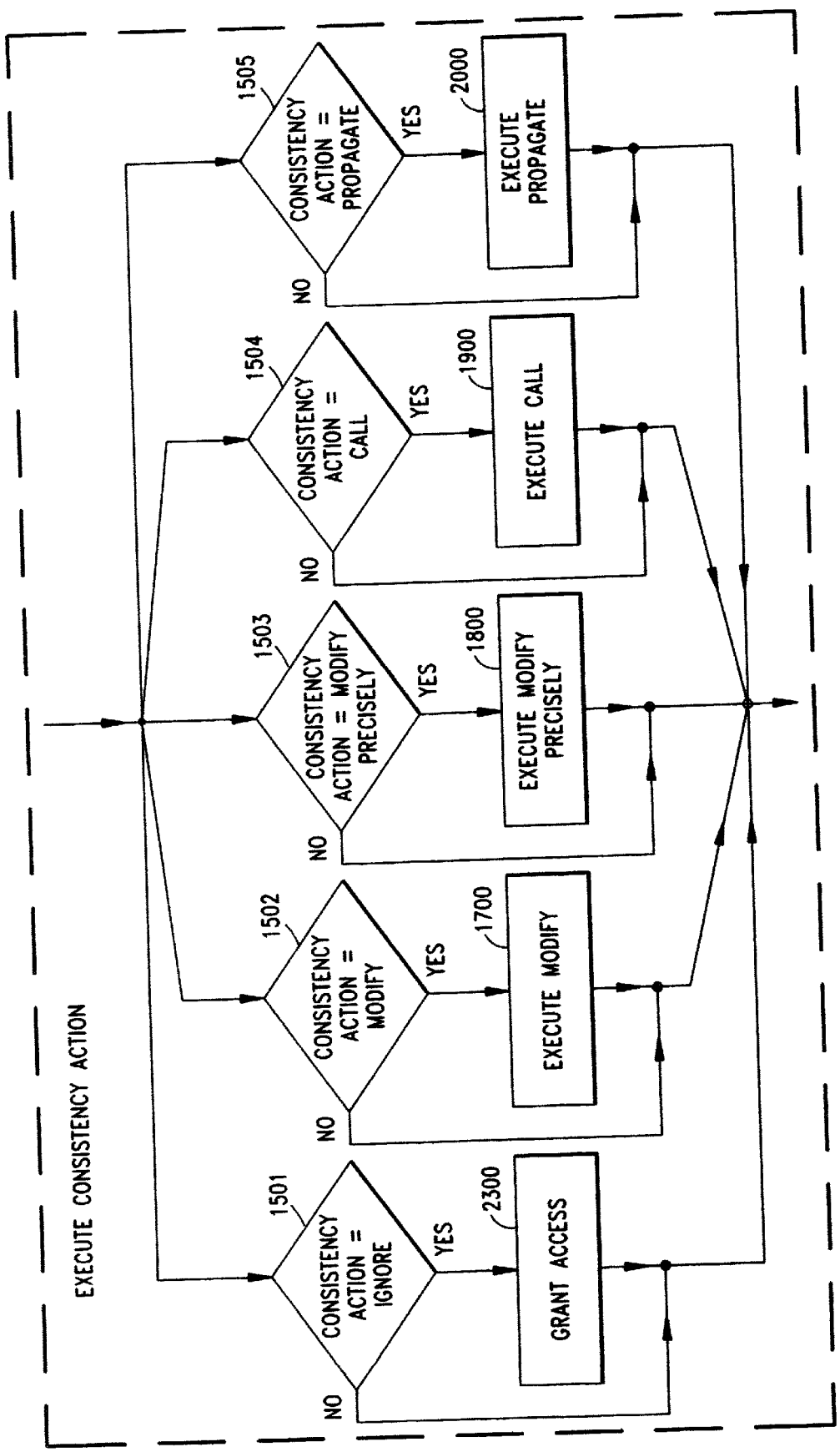
FIG. 14 describes how the consistency action is executed in accordance with the present invention.

The 'execute consistency action' (1500) of FIG. 14, selects one of the consistency actions supported by the preferred embodiment:

if consistency action is reject, reject requested operation;
if consistency action is ignore (step 1501) then grant access (2300);
if consistency action is notify (step 1502) then execute notify (1700);
if consistency action is notify precisely (step 1503) then execute notify precisely (1800);
if consistency action is call (step 1504) then execute call (1900);
if consistency action is propagate (step 1505) then execute propagate (2000).

Figure 15:
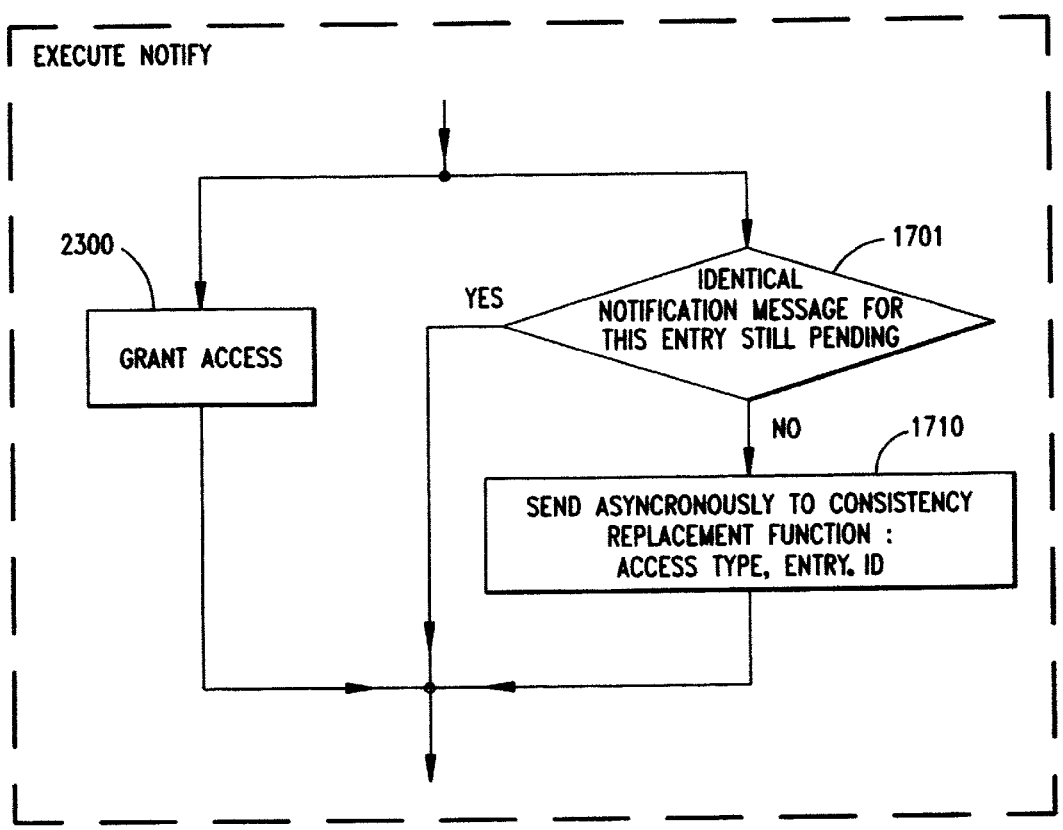
FIG. 15 describes how a notify action is executed in accordance with the present invention.

The 'execute notify' process flow (1700) of FIG. 15 checks (step 1701) whether there is currently a pending notification for the same entry (160) and the same access type (1001) (i.e. an identical notification). If "yes", the access is granted (2300) without additional notification. Otherwise, a notification message, including the access type (1001) and the entry.item.id (121), is sent to the consistency function (180) that is linked by link (190) to the entry (160) (step 1710). Concurrent to this notification, the access is granted (2300).

Figure 16:
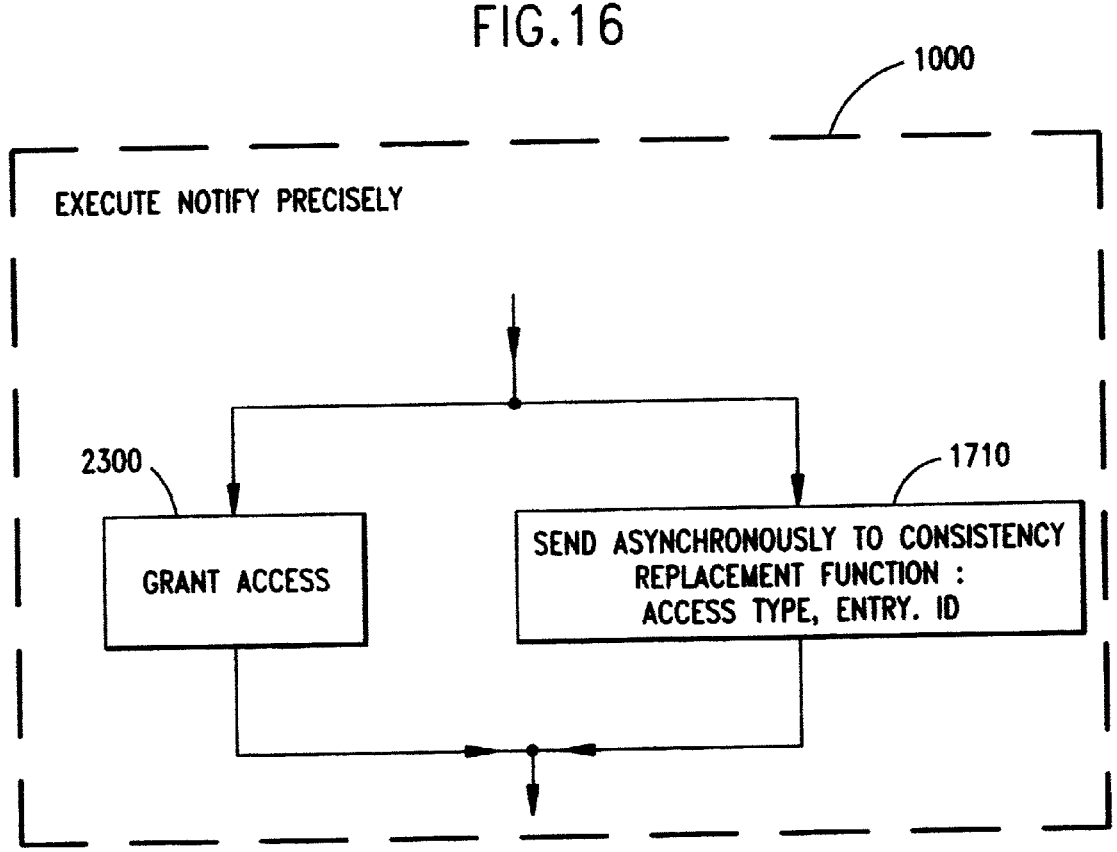
FIG. 16 describes how a notify-precisely action is executed in accordance with the present invention.

The 'execute notify precisely' flow (1800) of FIG. 16 unconditionally sends a notification as described above (step 1710) and, regardless of pending notifications, grants the access 2300).

Figure 17:
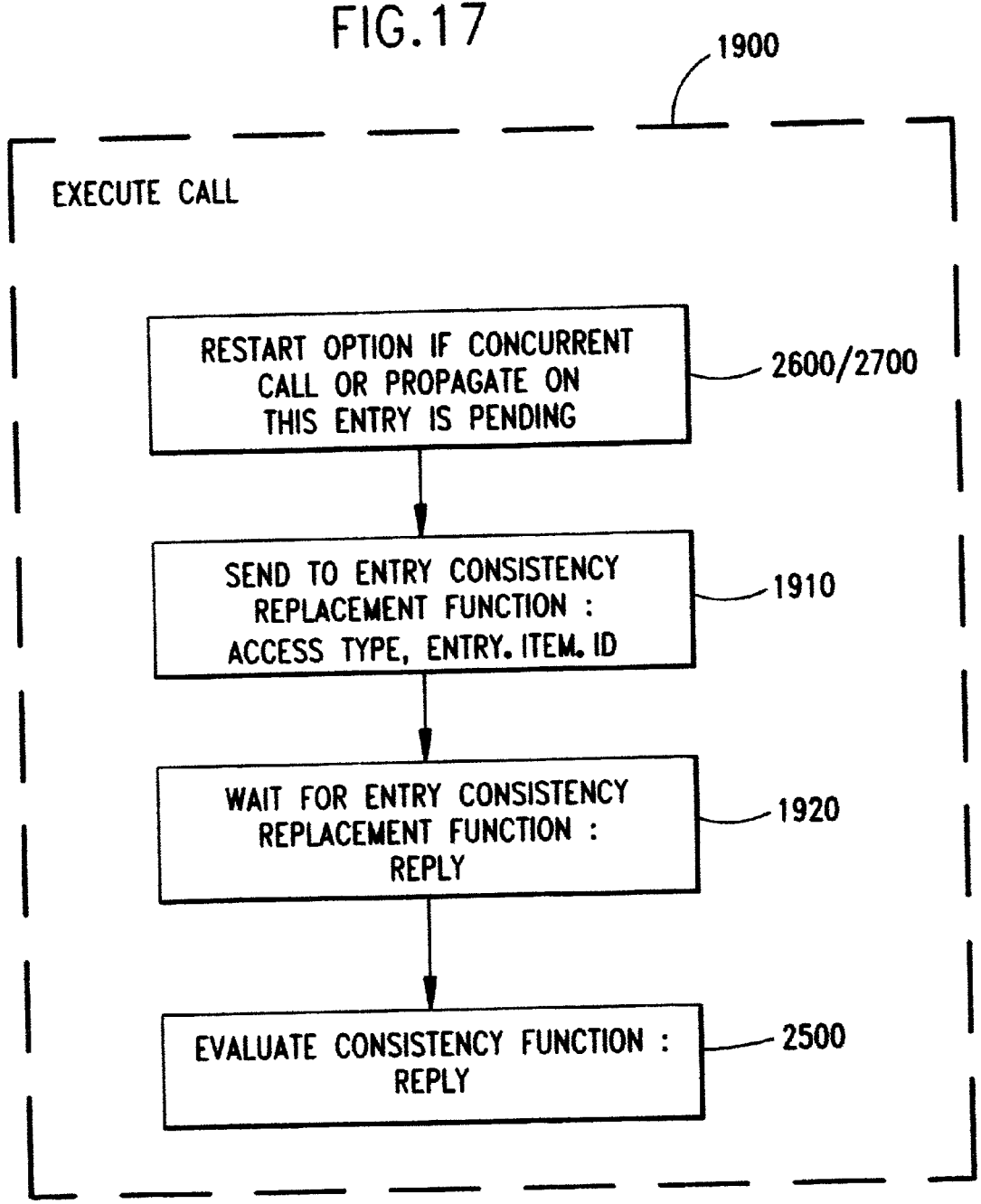
FIG. 17 describes how a call action is executed in accordance with the present invention.

The 'execute call' flow (1900) of FIG. 17 first invokes 'restart option . . . ' variant 1 (2600) or 'restart option . . . ' variant 2 (2700), to be detailed below. After the option is invoked, the access type (1001) and the entry.item.id (121) are sent to the consistency function (180) that is linked by link (190) to the entry (160) (step 1910). The process waits for a reply from the consistency function (180) (step 1920); and, once received, the reply is evaluated (2500).

Figure 18:
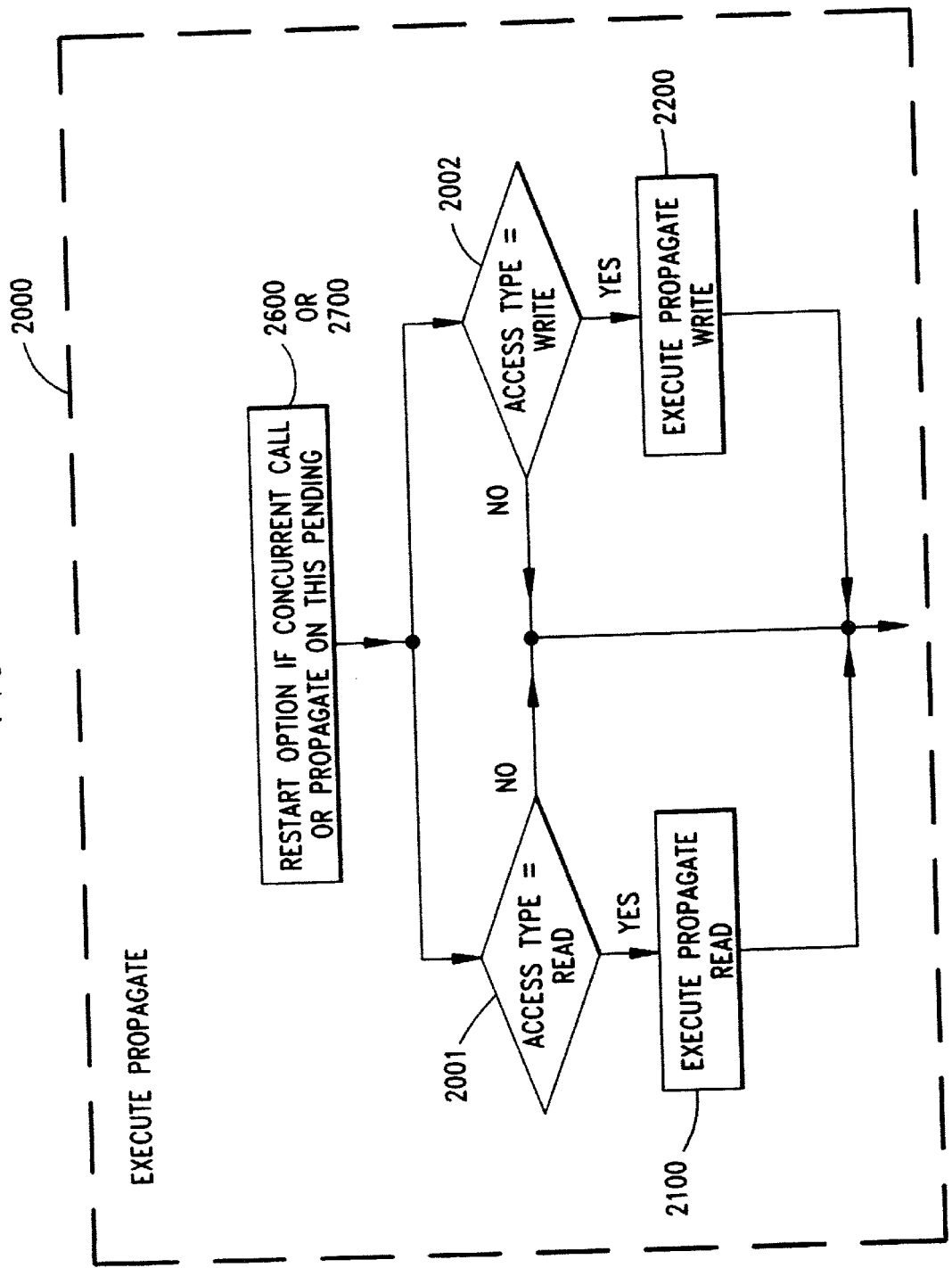
FIG. 18 describes how a propagate action is executed in accordance with the present invention.

The 'execute propagate' flow (2000) of FIG. 18 first invokes 'restart option . . . ' variant 1 (2600) or 'restart option . . . ' variant 2 (2700), to be detailed below. Depending upon the access type (1001), the process either invokes the below-detailed 'execute propagate read' flow (2100), if step 2001 delivered that the access type (1001) is read, or the 'execute propagate write' flow (2200) if the access type is write (step 2002).

Figure 19:
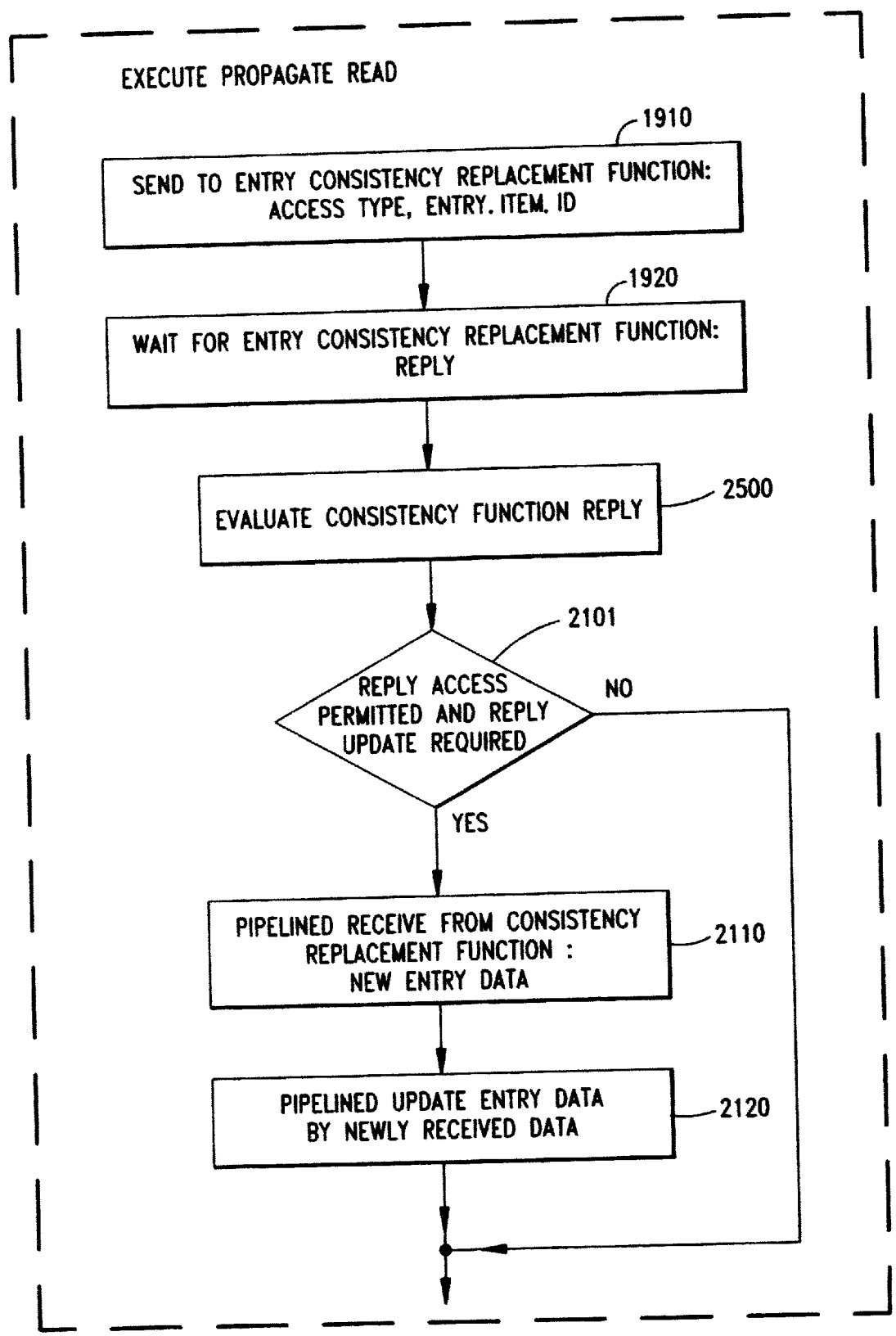
FIG. 19 describes how a propagate-read action is executed in accordance with the present invention.

The 'execute propagate read' flow (2100), FIG. 19, first sends the access type (1001) and the entry.item.id (121) to the consistency function (180) that is linked to the entry (160) (step 1910). It then waits for a reply from the consistency function (180) (step 1920) and evaluates the reply (2500). In addition to the fields 'reply.access restart' and 'reply.access permitted', this reply contains a further boolean value of 'reply.update required'. If 'reply.access permitted' is true and 'reply.update required' is also true, the consistency function (180) has signaled that the item data (122) has to be updated prior to delivering it to the accessor. In this case (steps 2110 and 2120), the cache component (100) receives new data, updates the entry (160) accordingly and delivers the updated data as the product or result of the read access. Note that receiving data, updating the entry (160) and sending data to the accessor can be pipelined and can therefore overlap for larger amounts of data, (i.e. the cache component (100) might start sending data to the accessor before it (100) receives all update data from the consistency-replacement function (180)). In particular, if only parts of the item data (122) must be updated, the not-to-be-updated parts can be sent prior to receiving the update data.

Figure 20:
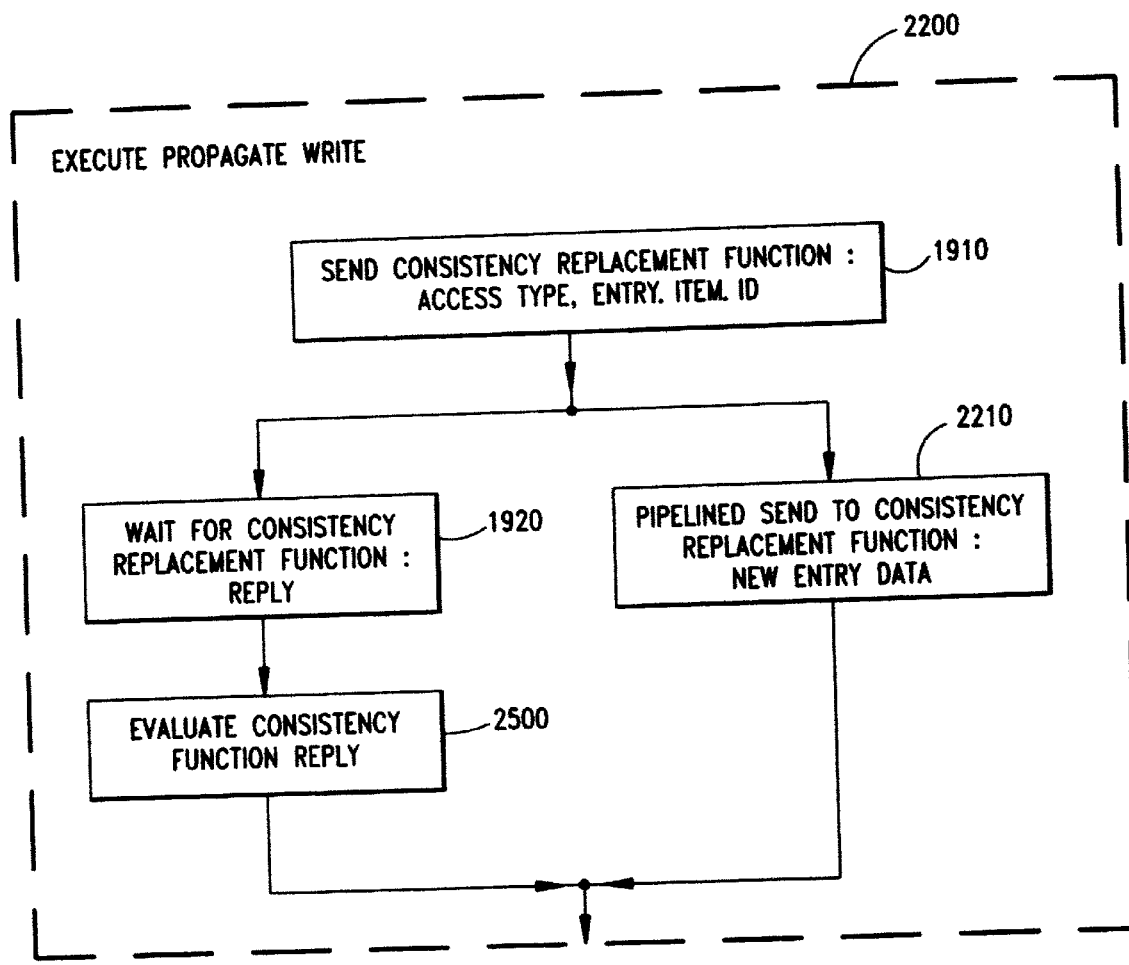
FIG. 20 describes how a propagate-write action is executed in accordance with the present invention.

The 'execute propagate write' flow (2200), FIG. 20, first sends the access type (1001) and the entry.item.id (121) to the consistency function (180) that is linked by link (190) to the entry (160) (step 1910). Next (step 2210), the process sends all item data that should be written into the entry (160) to the consistency-replacement function (180). In the preferred embodiment, this data propagation is handled concurrent with receipt of the item data from the accessor. Note that the item data (122) in the entry (160) is not yet overwritten by the new item data. In the preferred embodiment, the new data is written into a temporary entry first (not shown) while the operation waits for a reply from the consistency-replacement function (180) (step 1920). After it is received, the reply is evaluated (2500). In the case of a permitted write access, the preferred embodiment then logically copies the temporary entry into the originally selected entry (160). For software caches holding large items, this logical copy can be realized by changing pointers, without physically copying data. If no temporary item entry is written, the item data is simply sent to the consistency-replacement function (180) prior to when it is written into the item data (122) of entry (160).

Figure 21:
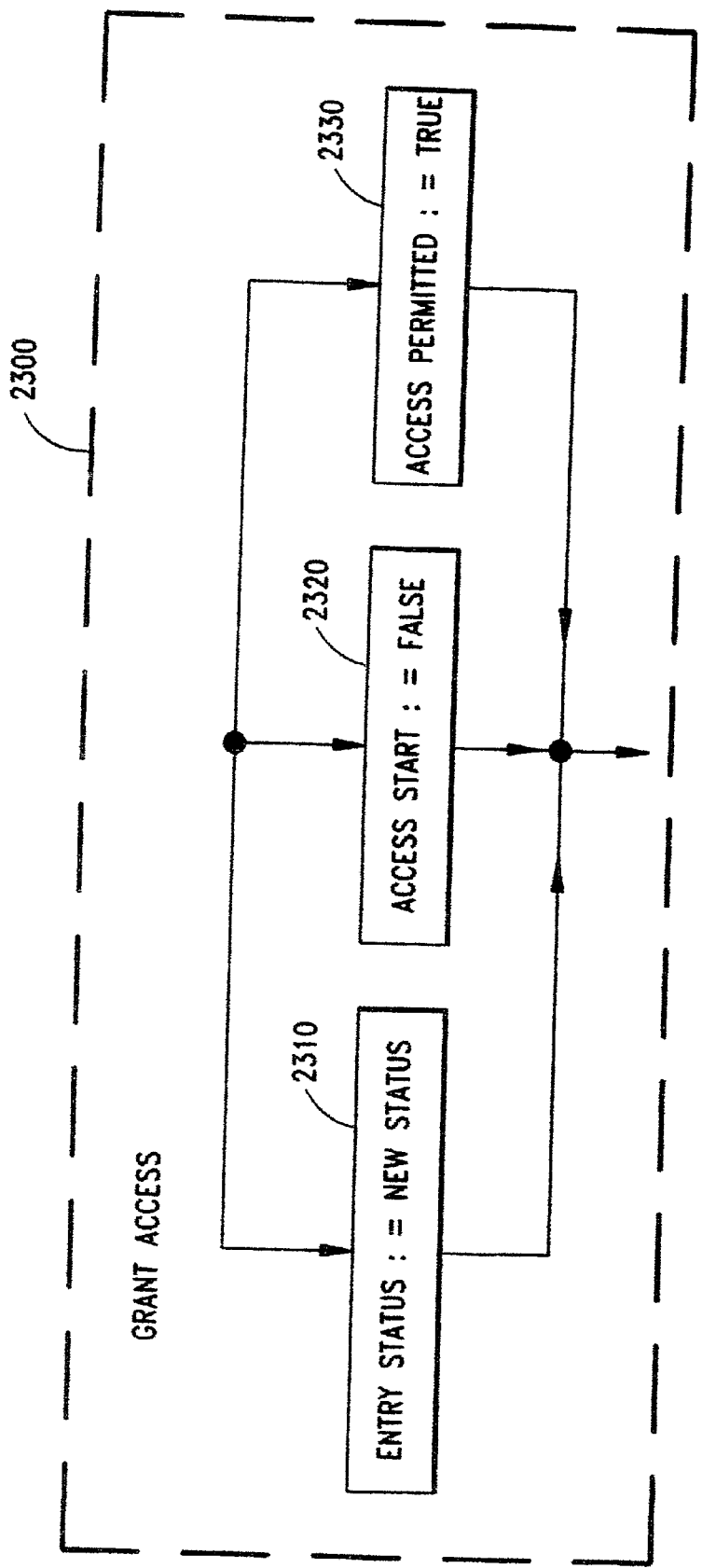
FIG. 21 describes how access is granted in accordance with the present invention.

For the 'grant access' flow (2300), FIG. 21, the process copies the new derived status bits (from 1400) to the status bits (130) of the entry (160) (step 2310). The process then sets the boolean 'access restart' to false (step 2320), and sets the boolean 'access permitted' to true (step 2330). The 'sensitive access' procedure (1000) then simply executes the requested access.

Figure 22:
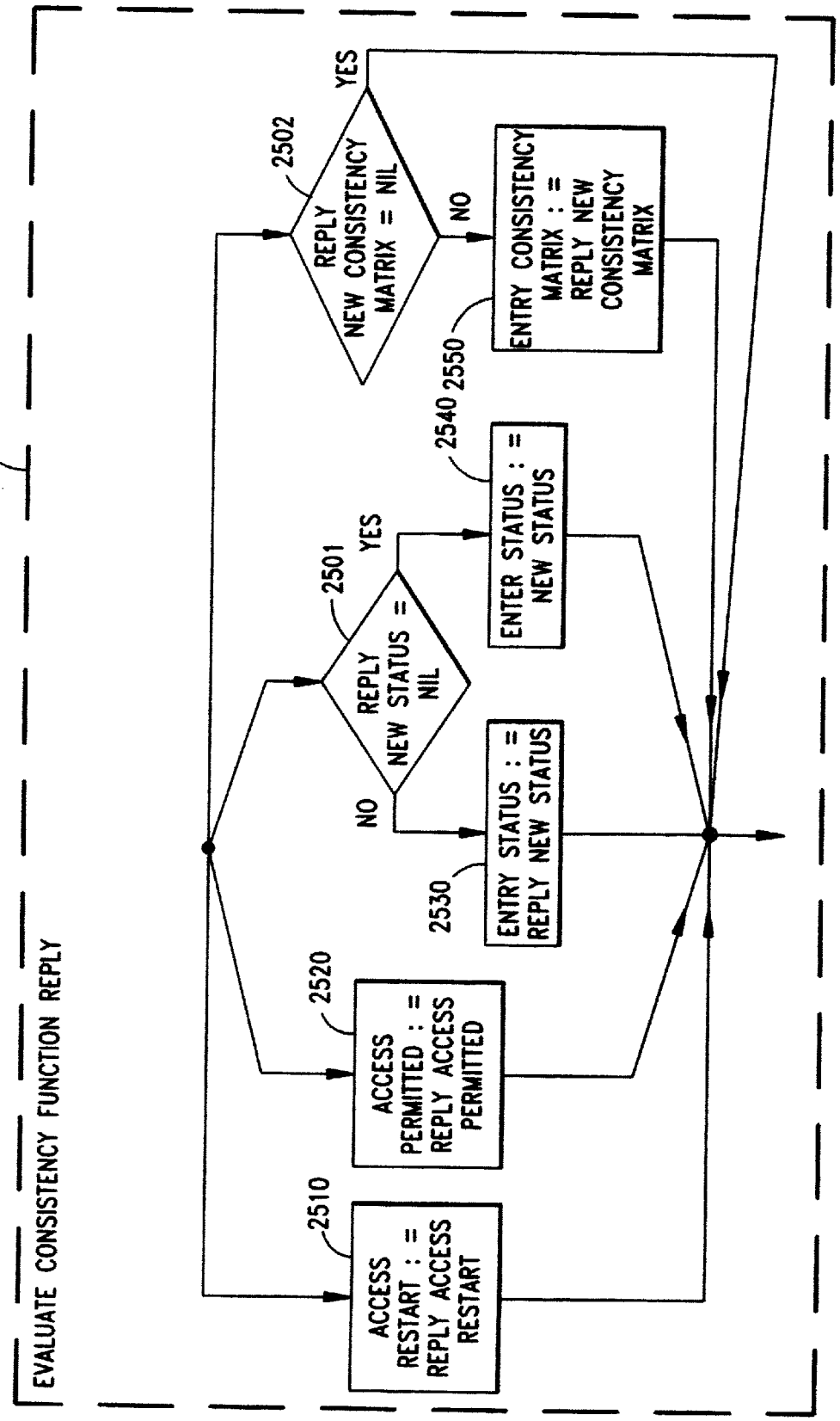
FIG. 22 describes how the reply of a consistency-replacement function is evaluated in accordance with the present invention.

In the 'evaluate consistency function reply' (2500) of FIG. 22, 'access restart' and 'access permitted' are extracted from the consistency-replacement function's (180) reply (steps 2510 and 2520). If the reply contains no new status bits (step 2501), the new status derived in the 'derive entry flow' (1400) is copied to the entry's (160) status bits (130) (step 2540). If the reply contains new status bit, the 'reply.new status' information is copied to the entry's (160) status bits (130) (step 2530). If the reply contains a new consistency-action matrix (step 2502), the process overwrites the entry's (160) consistency-action matrix (140) (step 2550).

Figure 23:
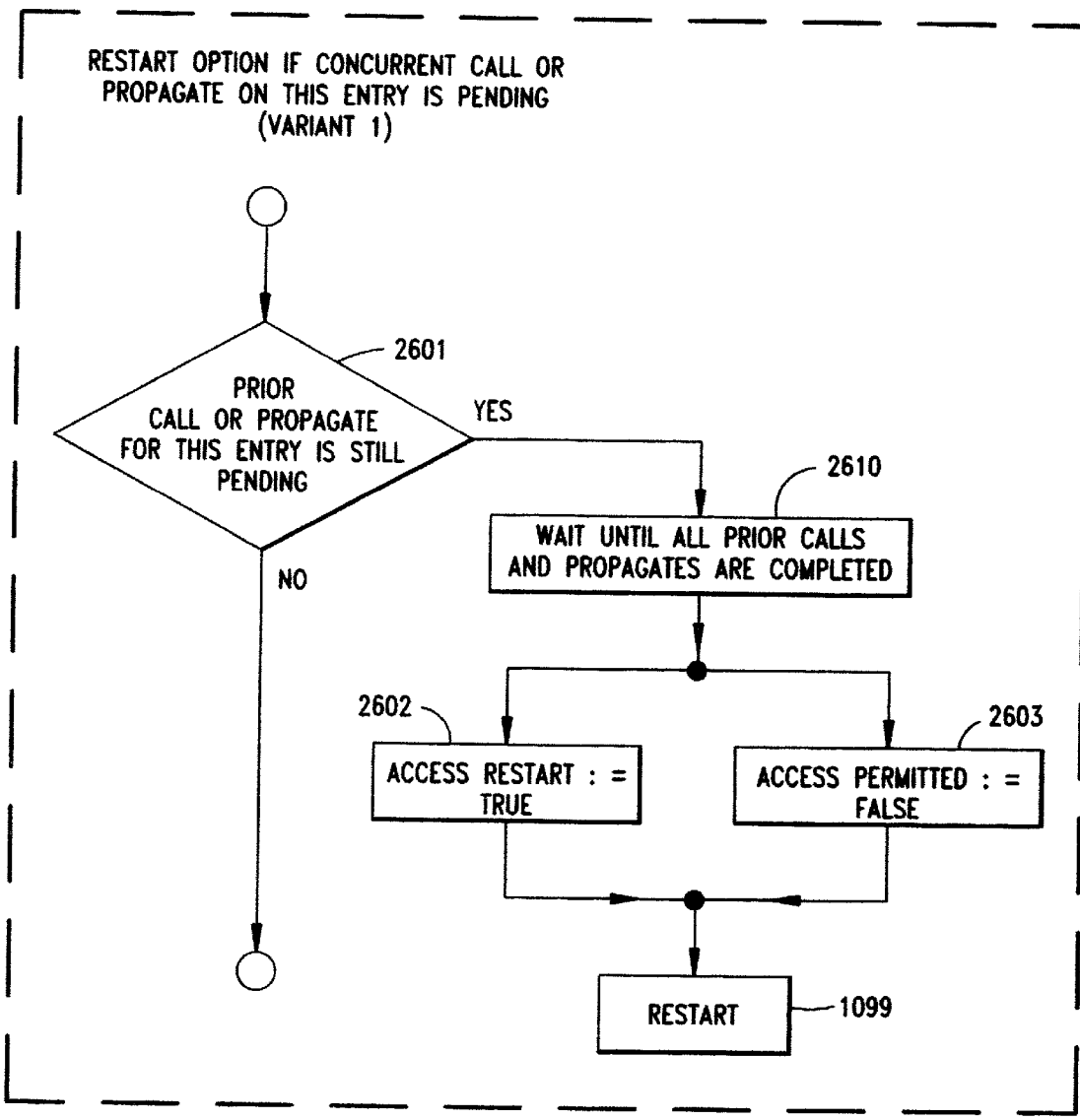
FIG. 23 describes variant 1 for dealing with concurrent call or propagates in accordance with the present invention.

Variant 1 of 'restart option if concurrent call or propagate on this entry is pending' (2600), FIG. 23, first checks whether there is currently another call or propagate action pending on the selected entry (160) (step 2601). Note that this is only possible if the cache component can handle multiple accesses to the same entry (160) concurrently or interleaved. If such an action is pending, it waits until all such pending actions on the entry (160) are completed (step 2610) and then initiates a restart of the entire access (steps 2602, 2603 and 1099). If no such action is pending, the restart option (2600) has no effect.

Figure 24:
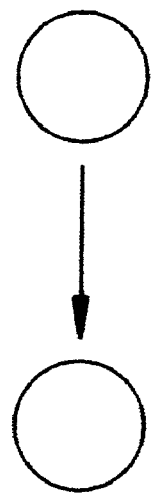
FIG. 24 describes variant 2 for dealing with concurrent call or propagates in accordance with the present invention.

Variant 2 of 'restart option if concurrent call or propagate on this entry is pending' (2700), FIG. 24, is empty, i.e. never has an effect. This variant can be used if concurrent or interleaved accesses to the same entry (160) cannot happen or if the consistency-replacement functions (180) handle this situation. In the latter case, a function (180) notices a concurrent or interleaved access to an item that is currently used in a call or propagate action and replies with 'reply.access permitted=false' or 'reply.access restart=true'.

Pseudocode for the foregoing processes is provided below:

```
PROC sensitive access
               (IN access type,
                requested item) :
    DO
        search for valid entry that holds requested item as item;
        IF entry found
            THEN general consistency action (access type, entry, access
restart, access permitted)
            ELSE handle miss
        FI
    UNTIL NOT access restart OD ;
    IF access permitted
        THEN access entry
        ELSE signal invalid access
    FI .
handle miss :
    determine default consistency replacement function;
    send to (default consistency replacement function, item, access
type);
    wait for (default consistency replacement function, reply);
    access restart := reply.access restart ;
    access permitted := reply.access permitted .
ENDPROC sensitive access ;
PROC general consistency action
               (IN access type,
                REF entry,
                OUT access restart, access permitted) :
    determine consistency action;
    determine consistency replacement function;
    derive new entry status;
    execute consistency action.
determine consistency action :
    i := 0 ;
    IF access type = write     THEN i := 1 FI ;
    j := 0 ;
    IF entry.status.dirty      THEN j := j+1 FI ;
    IF entry.status.accessed   THEN j := j+2 FI ;
    consistency action := entry.consistency action matrix [i,j] .
derive new entry status:
    new status.accessed := true ;
    new  status.dirty    := (access  type  =  write)  OR
entry.status.dirty .
execute consistency action:
    IF  consistency action = ignore
        THEN grant access
    ELIF consistency action = notify
        THEN execute notify
    ELIF consistency action = notify precisely
        THEN execute notify precisely
    ELIF consistency action = call
        THEN execute call
    ELIF consistency action = propagate
        THEN execute propagate
    FI .
execute notify:
    IF NOT identical notification message for this entry still
pending
        THEN send asynchronously (entry.consistency replacement
function, access type, entry.id)
    FI ;
    grant access.
execute notify precisely:
    send asynchronously (entry.consistency replacement function,
access type, entry.id);
    grant access.
execute call:
    restart option if concurrent call or propagate on this entry is
pending;
    send to (entry.consistency replacement function, access type,
entry.id);
    wait for (entry.consistence replacement function, reply);
    evaluate consistency function reply.
execute propagate:
    restart option if concurrent call or propagate on this entry is
pending;
    IF  access type = read THEN execute propagate read
    ELIF access type = write THEN execute propagate write
    FI .
execute propagate read:
    send to  (entry.consistency replacement function, access type,
entry id, reply);
    wait for (entry.consistency replacement function, reply);
    evaluate consistency function reply;
    IF reply.access permitted AND reply.update required
        THEN PIPELINED receive from (entry.consistency replacement
function, reply, entry data);
            PIPELINED update entry by newly received item data
    FI .
execute propagate write:
    send to (entry.consistency replacement function, access type,
entry id);
    PIPELINED send to (entry.consistency replacement function, new
entry data);
    wait for (entry.consistency replacement function, reply);
    evaluate consistency function reply.
grant access:
    entry.status       := new status ;
    access restart     := false ;
    access permitted   := true .
evaluate consistency function reply:
    access restart     := reply.access restart ;
    access permitted   := reply.access permitted ;
    IF reply.new status = nil
        THEN entry.status := new status
        ELSE entry.status := reply.new status
    FI ;
    IF NOT (reply.new consistency action matrix = nil)
        THEN entry.consistency action matrix := reply.new consistency
action matrix
    FI .
{VARIANT 1:}
    restart option if concurrent call or propagate on this entry is
pending:
        IF prior call or propagate for this entry is still pending
            THEN wait until all prior calls for this entry are collpleted;
                access restart       := true ;
                access permitted     := false ;
                LEAVE general consistency action
        FI .
{VARIANT 2:}
    restart option if concurrent call or propaqate on this entry is
pending: .
ENDPROC qeneral consistency action ;
```

Secondary Consistency Actions

A variant of the described method uses consistency-action matrices (140) where each element (see FIG. 25) holds a primary consistency action (3010), a secondary consistency action (3020) and a deadline timer (3030). Before the deadline (3030) is reached, the primary consistency action (3010) may be chosen, afterwards the secondary consistency action (3020) is invoked. A further variant (see FIG. 26) uses an access counter (3110) instead of a deadline timer. Whenever an element (141 . . . 148) of a consistency-action matrix is selected, its counter (3110) is decremented by one until it reaches the value 0. If the counter (3110) has a value above 0 prior to the decrement, the primary consistency action is selected; otherwise the secondary consistency action is invoked.

EXAMPLES

The consistency-action matrix (140) is a generic mechanism that can be used to implement a variety of different cache consistency protocols. As will be understood by one having skill in the art, some policies can be implemented in different manners by the inventive mechanisms. Therefore, only one method is detailed below, which may be the appropriate and optimal for some, but not all, protocols.

For a single cache component (100), classical write-through or write-back items can be used. Some consistency-replacement functions might even prefer a "do-not-care" policy that permits any access to the item without even signaling it to the consistency-replacement function. The consistency-replacement function can retrieve the item's state when replacing or removing it. For multiple cache components (100), effectively managing write-shared items is important. The write-shared-master policy solves this by propagating all requests (get-through/put-through) to the write-shared master. Further policies are MESI (Modified, Exclusive, Shared, Invalid) or the various release consistency policies.

"Write through"

Reading an item from the cache does not involve the consistency-replacement function. Writing the item in the cache is directly propagated to the consistency-replacement function which writes the new data to the storage.

For each of the following categories, the read and write states are depicted:

|  | unaccessed clean | unaccessed dirty | accessed clean | accessed dirty |
|---|---|---|---|---|
| read | ignore | ignore | ignore | ignore |
| write | propagate | propagate | propagate | propagate |

"Write back"

The consistency-replacement function is notified when the first write access occurs (when the clean item becomes dirty). When the consistency-replacement function decides to replace the item, it will write it back to storage if such a notification occurred.

For each of the following categories, the read and write states are depicted:

|  | unaccessed clean | unaccessed dirty | accessed clean | accessed dirty |
|---|---|---|---|---|
| read | ignore | ignore | ignore | ignore |
| write | notify | ignore | notify | ignore |

"Do not care"

Items can be freely read and written in the cache, but the consistency-replacement function is never invoked.

For each of the following categories, the read and write states are depicted:

|  | unaccessed clean | unaccessed dirty | accessed clean | accessed dirty |
|---|---|---|---|---|
| read | ignore | ignore | ignore | ignore |
| write | ignore | ignore | ignore | ignore |

"Write-shared master"

This protocol is intended for items that are write-shared over multiple cache components (100), usually in a software cache. Concurrent accesses to the item are coordinated by an appropriate consistency-replacement function, the "write-shared master". Reading as well as writing an item is always propagated to the consistency-replacement function associated to the item.

For each of the following categories, the read and write states are depicted:

|  | unaccessed clean | unaccessed dirty | accessed clean | accessed dirty |
|---|---|---|---|---|
| read | propagate | propagate | propagate | propagate |
| write | propagate | propagate | propagate | propagate |

"MESI" ME

The MESI protocol is a classical hardware protocol for multiprocessor caches. Entries can be Modified (dirty and not held by other caches), Exclusive (clean and not held by other caches), Shared (clean and perhaps also held by other caches) or Invalid (no valid entry, free cache entry). The current matrix (140) is used for M and E entries.

For each of the following categories, the read and write states are depicted:

|  | unaccessed clean | unaccessed dirty | accessed clean | accessed dirty |
|---|---|---|---|---|
| read | ignore | ignore | ignore | ignore |
| write | ignore | ignore | ignore | ignore |

"MESI" ME→S, S→S

When a consistency-replacement function receives a miss signal from a second cache for an item that currently resides as an M or E entry (160) in a first cache, the consistency-replacement function executes three steps:

1. Change the entry's consistency-action matrix (140) in the first cache to the form shown at its right;
2. If the entry's status (130) in the first cache is dirty, write the entry's value back to storage from the first cache and set the entry's status to clean; and
3. Load the item into the second cache and simultaneously set the entry's status (130) in second cache to unaccessed/clean and its consistency-action matrix (140) in the second cache to the form shown at the right.

In the terminology of the MESI protocol, the entries in both caches are in status S afterwards. When a miss is later signaled from a third cache and the entry (160) is still in status S, the consistency-replacement function only executes step 3 for the third cache.

For each of the following categories, the read and write states are depicted:

|       | unaccessed clean | unaccessed dirty | accessed clean | accessed dirty |
|-------|------------------|------------------|----------------|----------------|
| read  | ignore           | ignore           | ignore         | ignore         |
| write | call             | ignore           | call           | ignore         |

"MESI" S→M

The consistency-action matrix (140) for Shared entry (160) is constructed such that any write to such an entry (160) is signaled to the consistency-replacement function by the synchronous consistency action call. When the consistency-replacement function receives such a call by a first cache, the consistency-replacement function executes two steps:

1. Delete the item in all caches but the "calling" one. When during this period further caches also execute a write access and therefore rise a call, these accesses are restarted due to the deletion of the item thus leading to new misses; and
2. Set the entry's consistency-action matrix (140) in the first cache to the form shown at the right and grant access to the accessor.

In the terminology of the MESI protocol, the entry (160) in the first cache enters the M state and the entry (160) becomes I in all other caches, meaning it disappears in all other caches.

For each of the following categories, the read and write states are depicted:

|       | unaccessed clean | unaccessed dirty | accessed clean | accessed dirty |
|-------|------------------|------------------|----------------|----------------|
| read  | ignore           | ignore           | ignore         | ignore         |
| write | ignore           | ignore           | ignore         | ignore         |

The invention has been described with reference to several specific embodiments. One having skill in the relevant art will recognize that modifications may be made without departing from the spirit and scope of the invention as set forth in the appended claims.

What is claimed is:

1. A method for providing coherency among cached items stored in a system having at least one cache comprising a plurality of items, at least one status bit for each item, and a plurality of consistency action matrices, at least one consistency-action matrix for each item, comprising the steps of:
   receiving at least one request at said cache;
   selecting a consistency action for the item requested in said request from one of said at least one matrix;
   determining changes to said at least one item status bits for said requested item required by request; and
   executing said selected consistency action.

2. The method of claim 1 wherein said system further comprises a plurality of consistency functions linked to said cache items and further comprising the step of ascertaining which of said consistency functions is linked to said requested item.

3. The method of claim 2 further comprising invoking said linked consistency function.

4. The method of claim 1 wherein said selecting comprises locating a consistency action on said linked matrix based upon the type of said at least one request and the item status of said requested item.

5. The method of claim 1 further comprising the step of verifying that said at least one request relates to at least one cached item.

6. The method of claim 5 wherein at least one default consistency action is invoked if said at least one request does not relate to at least one cached item.

7. The method of claim 3 further comprising the step of writing new values for said at least one item status bit in connection with invocation of said linked consistency function.

8. The method of claim 3 further comprising the step of changing said consistency-action matrix in connection with invocation of said consistency function.

9. The method of claim 1 wherein said consistency action comprises an ignore action and wherein said executing comprises executing access to said requested item.

10. The method of claim 1 wherein said system has notification capability, said consistency action comprises a notify action, and said executing comprises the steps of:
    determining if notification is pending for said requested item;
    preparing a notification message for said requested item if no pending notification exists; and
    executing access to said requested item once notification exists.

11. The method of claim 1 wherein said consistency action comprises a notify precisely action and wherein said executing comprises the steps of:
    preparing a notification message for said requested item; and
    executing access to said requested item once notification preparation is complete.

12. The method of claim 2 wherein said consistency action comprises a call action and wherein said executing comprises the steps of:
    sending user request type and identity of said requested item to said consistency function linked to said requested item;
    waiting for a reply from said linked consistency function;
    determining if said reply comprises permission to access said item; and
    executing access to said requested item if said reply comprises permission to access said item.

13. The method of claim 12 further comprising the steps of:
    determining whether there are any pending consistency actions on said requested item; and
    suspending said call action until any pending consistency action has completed.

14. The method of claim 12 further comprising restarting said call action if said reply does not comprise permission to access said item.

15. The method of claim 2 wherein said consistency action comprises a propagate read action and wherein said executing comprises the steps of:
    sending user request type and identity of said requested item to said consistency function linked to said requested item;
    waiting for a reply from said linked consistency function;
    determining if said reply comprises permission to access said item;
    determining if said reply additionally comprises a requirement to update said requested item; and
    executing access to said requested item if said reply comprises permission to access said item.

16. The method of claim 15 wherein said executing access further comprises updating said requested item prior to executing access based upon a determination that said reply additionally comprises a requirement to update.

17. The method of claim 15 further comprising the steps of:
   determining whether there are any pending consistency actions on said requested item; and
   suspending said propagate action until any pending consistency action has completed.

18. The method of claim 15 further comprising restarting said propagate action if said reply does not comprise permission to access said item.

19. The method of claim 2 wherein said consistency action comprises a propagate write action and wherein said executing comprises the steps of:
   sending user request type and identity of said requested item to said consistency function linked to said requested item;
   waiting for a reply from said linked consistency function;
   determining if said reply comprises permission to access said item; and
   executing access to said requested item if said reply comprises permission to access said item.

20. The method of claim 19 wherein said executing access comprises updating said requested item.

21. The method of claim 20 further comprising writing a temporary entry for said requested item while waiting for said reply.

22. The method of claim 21 wherein said updating said requested entry comprises substituting said temporary entry for said requested item.

23. The method of claim 22 wherein said substituting comprises changing an item pointer from said requested item to said temporary entry.

24. The method of claim 19 further comprising the steps of:
   determining whether there are any pending consistency actions on said requested item; and
   suspending said propagate action until any pending consistency action has completed.

25. The method of claim 19 further comprising restarting said propagate action if said reply does not comprise permission to access said item.

26. The method of claim 1 wherein each of said at least one consistency action matrix comprises a first and a second consistency action matrix and at least one means for selecting among said first and said second matrix and further comprising, prior to said executing, selecting among said first and said second matrix.

* * * * *